(12) United States Patent
Janakiraman et al.

(10) Patent No.: US 12,450,442 B1
(45) Date of Patent: Oct. 21, 2025

(54) GENERATING RESPONSES USING A CONTEXT ENGINE COUPLED WITH A LOGIC ENGINE AND TIME PHRASE RESOLUTION

(71) Applicant: Dropbox, Inc., San Francisco, CA (US)

(72) Inventors: Rajkumar Janakiraman, Sammamish, WA (US); Ranjitha Gurunath Kulkarni, Sunnyvale, CA (US); James Johnson, San Marcos, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/057,835

(22) Filed: Feb. 19, 2025

(51) Int. Cl.
*G06F 40/30* (2020.01)
*G06F 16/3329* (2025.01)

(52) U.S. Cl.
CPC .......... *G06F 40/30* (2020.01); *G06F 16/3329* (2019.01)

(58) Field of Classification Search
CPC .............................. G06F 16/3329; G06F 40/30
See application file for complete search history.

(56) References Cited

U.S. PATENT DOCUMENTS

| | | | |
|---|---|---|---|
| 5,950,190 A * | 9/1999 | Yeager | G06F 16/26 |
| 7,562,061 B2 | 7/2009 | Emek et al. | |
| 7,843,939 B2 | 11/2010 | Butler et al. | |
| 8,271,406 B2 | 9/2012 | Danna et al. | |
| 8,433,668 B2 | 4/2013 | Emek et al. | |
| 8,438,743 B2 | 5/2013 | Wallen et al. | |
| 8,559,440 B2 | 10/2013 | Butler et al. | |
| 9,158,773 B2 | 10/2015 | Clark et al. | |
| 9,911,082 B2 | 3/2018 | Clark et al. | |
| 10,140,101 B2 | 11/2018 | Allen et al. | |
| 10,345,640 B2 | 7/2019 | Pan | |
| 2016/0378853 A1* | 12/2016 | Mohammad | G06F 16/3344 707/706 |
| 2017/0220554 A1* | 8/2017 | Carter | G06F 40/284 |
| 2017/0228368 A1* | 8/2017 | Carter | G06N 5/022 |
| 2021/0342710 A1* | 11/2021 | Cornelio | G06F 16/2246 |
| 2024/0289407 A1* | 8/2024 | Rofouei | G06F 16/9577 |
| 2024/0394479 A1* | 11/2024 | Pathak | G06F 40/295 |
| 2025/0111147 A1* | 4/2025 | Pryzant | G06F 40/56 |
| 2025/0111220 A1* | 4/2025 | Jones | G06N 3/08 |

OTHER PUBLICATIONS

Pan L., et al., "Logic-LM: Empowering Large Language Models With Symbolic Solvers for Faithful Logical Reasoning," ACL anthology, 2023, pp. 3806-3824.

* cited by examiner

*Primary Examiner* — Eric Yen
(74) *Attorney, Agent, or Firm* — Keller Preece PLLC

(57) ABSTRACT

The present disclosure relates to systems, non-transitory computer-readable media, and methods for generating responses to prompts by utilizing a context engine and a logic engine. In one or more embodiments, the disclosed systems can determine a prompt received from a client device involves one or more logical problems with a prompt classification model. Based on identifying the one or more logical problems, the disclosed systems can generate a logic code segment by processing the prompt with one or more large language models within a context engine. The disclosed systems can generate a logic result for the prompt by processing the logic code segment with a logic engine that solves one or more logical problems within the prompt according to the structure of the logic code segment. The disclosed systems can generate a response to the prompt based, at least in part, on the logic result.

20 Claims, 15 Drawing Sheets

GENERATING RESPONSES USING A CONTEXT ENGINE COUPLED WITH A LOGIC ENGINE AND TIME PHRASE RESOLUTION

BACKGROUND

Recent years have seen significant developments in the capabilities of large language models. Indeed, the increased popularity of large language models in the ever-evolving context of the internet has led to diverse applications of such models across various tasks, such as generating, summarizing, translating, and classifying digital content across connected and/or isolated and distinct computer applications and systems. For example, some existing systems utilize large language models as part of computer applications to perform tasks ranging from summarizing books to generating images. As the capabilities of large language model has grown, some existing systems have begun to integrate large language models into programming architecture, data analysis pipelines, or other data processing systems to perform various tasks. For example, some existing systems utilize large language models to generate responses to queries or as part of retrieval-augmented generators (RAGs) to retrieve information and generate responses specific to various contexts or domains. Despite these advances, some existing systems exhibit several problems in relation to accuracy and efficiency.

A particular area of inaccuracy in existing systems is when it comes to generating responses using large language models to perform logical or deductive reasoning. The main driver behind such inaccuracies lies in the architecture of existing large language models. Existing large language model architecture is designed to provide state-of-the-art capabilities when it comes to generative tasks (such as next sentence prediction, creative text generation, or image synthesis), but at the same time, this architecture is inherently prone to inaccurate responses in the context of logical reasoning, such as solving puzzles or mathematical problems. Language models tend to generalize rules based on training on large language sets, but they lack precision for strict analysis of logical and/or mathematical problems.

As a contributing factor to their inaccuracies, some existing systems train models using overgeneralized knowledge bases. Existing systems often utilize large language models that are trained over enormous databases of common general data to achieve broad coverage of output generation across a wide array of contexts. Unfortunately, a consequence of such wide-ranging and generalized training is that the resulting large language models often hallucinate, generating erroneous, irrelevant, or incorrect responses (or other outputs) that the models treat as true. Even in circumstances where models are more focused on narrower data domains, their native architecture is nevertheless prone to such hallucinations. Without ways to remediate the inaccurate outputs generated by existing large language models, many conventional systems produce unreliable outputs, which negatively affect downstream analysis and/or use of such outputs.

In addition to their inaccurate analysis, existing systems suffer from inefficiency. More specifically, because some existing systems perform tasks or generate responses inaccurately due to imprecise logical reasoning, such existing systems require excessive back-and-forth communications with devices to improve responses. Indeed, existing systems often require correction from client devices providing new prompts and corrective instructions to fix logical errors of large language models, sometimes even requiring multiple prompts to correct a single error. As a result, many of these existing systems unnecessarily utilize excessive computing resources by processing the excessive back-and-forth communications stemming from such inaccuracies. In some cases, large language models of existing systems require step-by-step instructions from devices to generate an answer that involves or relates to logic or mathematics. Not only is the sheer number of prompts excessive, but generating such prompts can be tedious and require a large degree of interaction from the user with a graphical user interface of a client device. Thus, conventional large language models unnecessarily utilize large amounts of computing resources to address logical problems that appear in prompts.

These, along with additional problems and issues, exist with regard to conventional large language model systems.

SUMMARY

Embodiments of the present disclosure provide benefits and/or solve one or more of the foregoing or other problems in the art with systems, non-transitory computer readable media, and methods for generating responses to prompts that involve logical and/or mathematical reasoning by utilizing a framework that integrates a context engine comprising one or more large language models with a logic engine. In some embodiments, the disclosed systems can classify a prompt received from a client device as a logic prompt (e.g., a prompt that involves logical reasoning to generate a response) by utilizing a prompt classification model. In some cases, based on classifying the prompt as involving one or more logical problems (or mathematical problems), the disclosed systems can generate a logic code segment using one or more large language models as orchestrated by a context engine. In some embodiments, the disclosed systems can generate a logic result for the prompt by processing the logic code segment with a logic engine that solves one or more logical problems within the prompt. In one or more embodiments, the systems process the logic code segment according to the structure (or language) of the logic code segment. Additionally, the disclosed systems can generate a response to the prompt based, at least in part, on the logic result.

BRIEF DESCRIPTION OF THE DRAWINGS

The detailed description provides one or more embodiments with additional specificity and detail through the use of the accompanying drawings, as briefly described below.

DETAILED DESCRIPTION

This disclosure describes one or more embodiments of a logic context system that utilizes a context engine and a logic engine to generate a response to a prompt by, in part, solving one or more logical and/or mathematical problems within the prompt. In many scenarios, large language model prompts call for more than generative capabilities such as next sentence prediction. For instance, prompts often invoke logical reasoning and/or mathematical analysis in addition to (or alternatively to) generative functions. To accommodate these scenarios, the logical context system can address the need to employ logical reasoning to generate a response by adapting the response generation processes to include a logic engine that implements logical reasoning to accurately and efficiently produce a response to the prompt.

Figure 1:
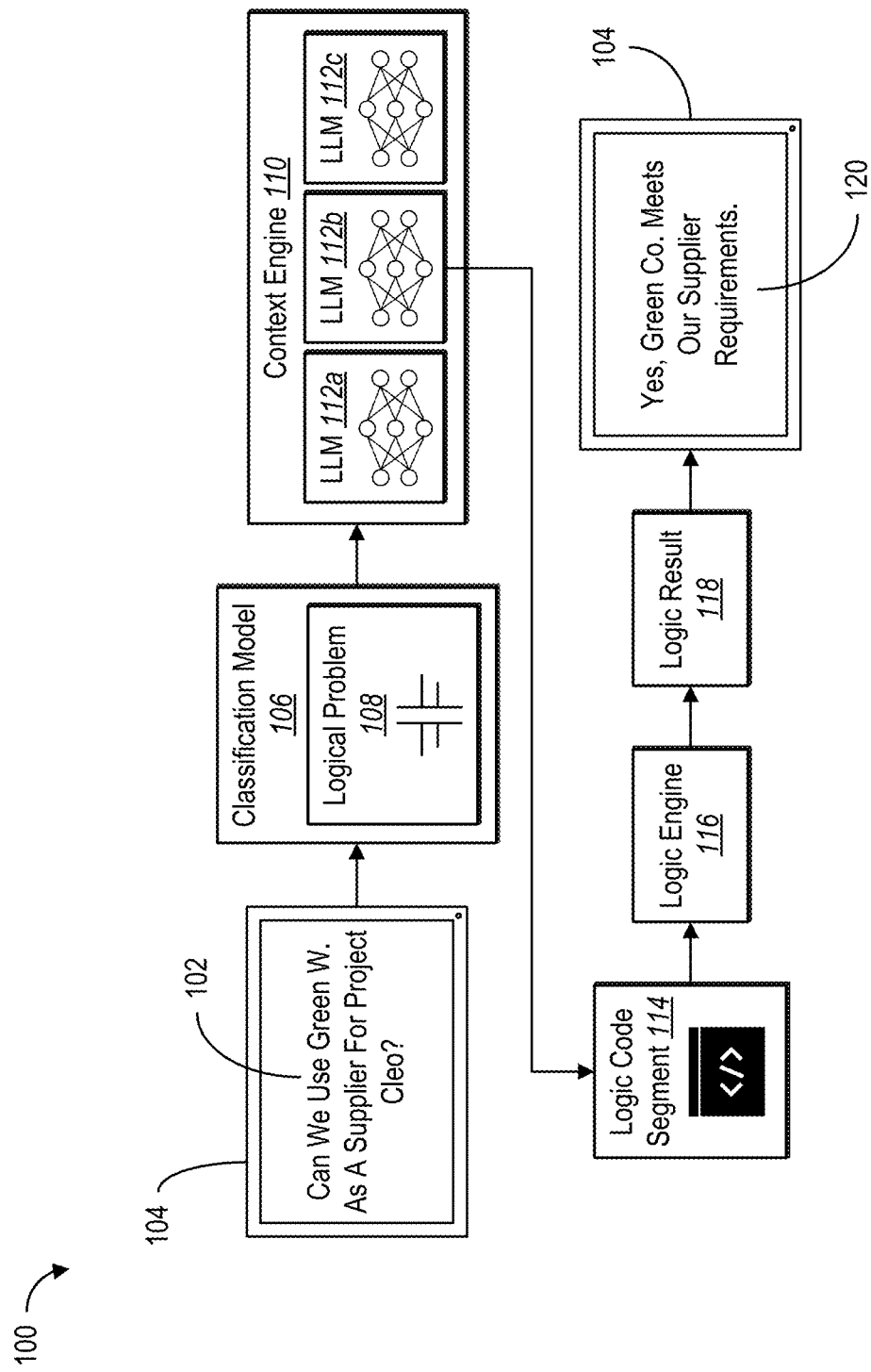
FIG. 1 illustrates an example overview of a logic context system generating a response to a prompt in accordance with one or more embodiments.

FIG. 1 illustrates an example overview of a logic context system generating a response to a prompt in accordance with one or more embodiments. As shown in FIG. 1, the logic context system 100 can receive a prompt 102 from a client device 104. In particular, the prompt 102 can request performance of a task, information retrieval, image generation, and/or an answer to a query. As shown in FIG. 1, the logic context system 100 can receive the prompt 102 requesting, "Can we use Green Co. as a supplier for Project Cleo?" In one or more embodiments, the logic context system 100 can determine that the prompt 102 involves one or more logical problem(s) 108 utilizing a classification model 106. In one or more embodiments, the classification model 106 can analyze the prompt 102 and determine if the prompt 102 requires (or lends itself to) logical reason and/or mathematical problem solving to generate a response 120. In some cases, the client device 104 utilizes a context engine 110 to dissect or decompose the prompt 102 into subcomponents (e.g., sub-prompts) and further utilizes the classification model 106 to determine whether the individual subcomponents require logical and/or mathematical reasoning. In some cases, the logic context system 100 can classify the prompt as a logic prompt because the prompt 102 involves the logical problem(s) 108.

For example, based on the need to employ reasoning to determine if Green Co. fulfills conditions to employ as a supplier as outlined by the entity and/or user account associated with the client device 104, the classification model 106 can classify the prompt 102 as a logic prompt and/or a prompt that involves logical problem(s) 108. For instance, the classification model 106 can determine that the prompt 102 involves deductive reasoning, cost-benefit reasoning, logical elimination reasoning, and/or comparative reasoning by determining if Green Co. fulfills certain regulations or certifications, if Green Co.'s bid falls within the budget, comparing Green Co.'s bid with the bids of other suppliers, and if Green Co. utilizes approved materials. Indeed, the prompt 102 involves logic or logical problem(s) 108 to determine whether or not Green Co. fulfills various conditions. In some cases, the logic context system 100 can train the classification model 106 to recognize or classify the prompt 102 as the logic prompt or as involving the logical problem(s) 108 by providing one or more logic prompt examples or prompts including the logical problem(s) 108 to the classification model 106. For example, the logic context system 100 can feed a prompt with one or more logical problems (or mathematical problems) to the classification model 106 (e.g., large language model or machine learning model). In one or more cases, the classification model 106 can be trained or instructed with a few-shot learning framework. Indeed, the context engine 110 can determine which subcomponents of the prompt 102 require the logic engine 116 and which subcomponents can be accurately addressed with a large language model.

As further shown in FIG. 1, the logic context system 100 can provide the prompt with the logical problem(s) 108 to a context engine 110 that includes or interfaces with one or more large language models 112a-c. As shown in FIG. 1, the logic context system 100 can utilize the context engine 110 to decompose the prompt 102 into subcomponents that each correspond to respective data domains and that, when executed together, result in a response to the prompt 102. The logic context system 100 further utilizes the context engine 110 to generate domain-specific prompts for each of the subcomponents, where each of the domain-specific prompts tailors or customizes a large language model to the domain at hand, effectively preparing or tuning the large language models 112a-c for a specific use case. For example, in some cases, the logic context system 100 can train the large language model 112a with one or more domain-specific prompts to generate a customized large language model that can handle prompts related to the given domain. Indeed, the logic context system 100 can generate a variety of large language models customized to handle various domains.

In some embodiments, the logic context system 100 further determines which, if any, of the subcomponents require or correspond to logical reasoning (or involve the logical problem(s) 108). Indeed, in some cases, the logic context system 100 utilizes the classification model 106 to classify each of the subcomponents of the prompt 102, thus identifying which of the subcomponents involve logic (or the logical problem(s) 108) and which do not. For example, in one or more cases, if a subcomponent does not involve logical reasoning, the logic context system 100 can utilize a large language model 112a-c to generate a response for that non-logic subcomponent. In certain embodiments, the logic context system 100 thus determines which of the large language models 112*a-c* to integrate or interface with logic engines to solve logical problem(s) 108 indicated in the subcomponents (or in the overall prompt 102). In some cases, the logic context system 100 identifies multiple logical problems in the prompt 102 and thus assigns the large language models 112*a-c* to respective logical problem(s) 108. Accordingly, the logic context system 100 can utilize the context engine 110 to gather and/or process information (e.g., source content items) for subcomponents of the prompt 102 that do not involve logical reasoning (e.g., logical problems 108 or mathematical problems).

In addition, the logic context system 100 can utilize the context engine 110 to generate a logic code segment 114 for the prompt 102 (e.g., prompt subcomponent, logical problem(s) 108 or the overall logic prompt). Indeed, the logic context system 100 generates a logic code segment 114 that outlines subroutines and/or processes instructing a logic engine 116 to generate a logic result 118 (or answer) to the one or more logical (or mathematical) problems within the prompt 102. For example, the context engine 110 can utilize the large language model 112*b* to generate the logic code segment 114 for a particular logical problem. The logic code segment 114 can include or represent one or more constraints (e.g., logic constraints) that, when satisfied, solve the one or more logical problem(s) 108 identified within the prompt 102. For example, the logic context system 100 can utilize (or select) the large language model 112*a* to generate the logic code segment 114 with one or more constraints outlining the one or more conditions required by the entity to employ suppliers.

As illustrated in FIG. 1, the logic context system 100 can process the logic code segment 114 with a logic engine 116. In one or more embodiments, the logic engine 116 can include or refer to one or more satisfiability modulo theories (SMT) solvers and/or SMT libraries that solve logical and/or mathematical problems. For example, the logic engine 116 can utilize algorithms or subroutines involving linear arithmetic, uninterpreted functions, nonlinear arithmetic, datatypes, strings, polymorphic arrays, bivectors, probabilistic logic, etc., to solve one or more problems utilizing SMT solvers and/or SMT libraries. In some cases, the logic engine 116 can be a mathematic engine or include a mathematic engine. In some cases, the logic engine 116 can be or include a code interpreter, compiler, or any other type of environment capable of interpreting, compiling, and/or executing programming (or coding) language instructions.

In one or more embodiments, the context engine 110 can solve one or more logical problems within the prompt 102 according to a structure of the logic code segment 114. For example, the context engine 110 (e.g., via the large language model 112*b*) can generate the logic code segment 114 with a structure that corresponds with a type of programming (or coding) language (e.g., Java, C++, Python, JavaScript, Haskell, etc.). In some cases, the logic context system 100 can select the logic engine 116 that corresponds to the structure of the logic code segment 114. Indeed, different programming languages often have different structures defining variable types, formatting, memory allocation, and/or organization of software-level commands calling instruction sets or machine-level commands of a processor.

Relatedly, as shown in FIG. 1, the logic context system 100 can generate a logic result 118 for the one or more problems within the prompt 102. In particular, the logic context system 100 can utilize the logic engine 116 to generate a logic result 118 (e.g., answer, value, object, etc.) for the logic problem 108 analyzed and solved using the logic engine 116 as instructed by the large language model 112*b*. In some cases, the large language model 112*b* uses the logic engine 116 to generate the logic result 118 by processing the logic code segment 114 according to its structure and constraints (as recognized by the logic engine 116). In some cases, logic result 118 is an amalgamation of multiple logic sub-results that each correspond to a respective sub-component of the prompt 102 and that are generated by respective large language models 112*a-c*. Indeed, the logic context system 100 can combine multiple logic results together to generate an overall logic result.

As FIG. 1 indicates, the logic context system 100 can utilize the logic result 118 to generate a response 120 to the prompt 102. For example, the logic context system 100 can include the logic result 118 (or solution) to the one or more problems within the prompt 102 in the response and/or base the response in part on the logic result 118. For example, based on the logic engine 116 determining that Green Co. meets the conditions for hire by the entity, the logic engine 116 can generate the logic result 118, indicating satisfaction of the constraints within the logic code segment 114. Moreover, in one or more cases, the logic context system 100 can combine the logic result 118 (or multiple logic results) with other sub-responses to subcomponents in the prompt 102 that do not involve logic (or mathematics) to generate the response 120. For example, the logic context system 100 can utilize the large language model 112*a* of the context engine 110 or a separate large language model to generate the overall (or comprehensive) response. In some cases, the logic context system 100 can utilize the context engine 110 to generate the response 120 in a natural language format. For example, the logic context system 100 can generate the response 120, "Yes, Green Co. meets our supplier requirements." In one or more embodiments, the logic context system 100 can base the response in part on additional information (e.g., source content items).

As indicated above, the logic context system 100 provides a number of advantages over conventional systems. For example, the logic context system 100 provides improved accuracy, flexibility, and computational efficiency over existing systems. In particular, the logic context system 100 improves accuracy by implementing logic engines (e.g., SMT solvers) that include an architecture for solving logical and mathematical problems. As indicated above, unlike conventional large language models that generate inaccurate responses in the context of logical reasoning, the logic context system 100 can utilize a logic engine that can utilize formulas, theories, constraints, etc. to solve puzzles and mathematical problems. Indeed, the logic context system 100 can utilize logic engines that precisely implement logical and/or mathematical rules while solving problems. Relatedly, unlike some systems that train large language models on overgeneralized knowledge bases, the logic context system 100 uses logic engines that are not solely reliant on a broad spectrum of common knowledge but instead (or also) implement additional computer applications (e.g., logic engines) specially designed for logical reasoning. Such implementation improves (or ensures) the accuracy and robustness of responses of the logic context system 100 to prompts that involve deductive and/or mathematical reasoning.

Moreover, the logic context system 100 improves computational efficiency by avoiding the computational cost of processing an unnecessary number of back-and-forth communications (e.g., user inputs, prompts, or queries) when generating a response to a prompt that involves reasoning or mathematics. Indeed, the logic context system 100 can utilize the context engine and logic engine to accurately solve logical and/or mathematical problems from the start, thus avoiding the need for back-and-forth communications to correct inaccurate responses. Indeed, the accuracy of the logic context system 100 negates or at least reduces rounds of processing logical and/or mathematical problems to come to the correct result. Such improvements result in reducing the number of user interactions as well as the corresponding computational load and bandwidth requirement for facilitating such user interactions.

Indeed, due at least in part to the increased accuracy, the logic context system 100 can improve computing efficiency over existing systems by decreasing the number of user interactions with a graphical user interface of a client device. For instance, unlike some systems that require a user to input highly detailed step-by-step instructions for prompts that involve deductive reasoning or mathematics, the logic context system 100 can utilize a context engine and logic engine to generate constraints that solve logical and mathematical problems. The logic context system 100 thus reduces the tedious and highly voluminous number of user interactions with a graphical user interface of a client device. Indeed, the logic context system 100 can provide accurate responses to prompts while decreasing the number of user interactions when inputting the prompt.

Indeed, the logic context system 100 improves response flexibility by providing a unique framework that allows users to utilize various large language models and logic engines to perform a variety of tasks. As opposed to existing systems that rigidly perform tasks with a single large language model, the logic context system 100 can call upon various large language models and logic solvers within the logic engine to flexibly adapt to problems that cannot be solved by a single large language model alone.

As illustrated by the foregoing discussion, the present disclosure utilizes a variety of terms to describe features and benefits of the logic context system 100. Additional detail is hereafter provided regarding the meaning of these terms as used in this disclosure. As used herein, the term "prompt" includes or refers to an instruction or query to perform a task or action. In one or more embodiments, a prompt can include text data, image data, or some other data) directing the context engine and/or large language model to perform a specific task or answer a query. For example, a prompt can be an instruction given in natural language, such as, "How many days until the Green Co. contract expires?" In some cases, the prompt can include characters and/or symbols such as mathematical operators, numbers, etc. In one or more cases, the logic context system 100 can analyze the prompt to determine if any portions involve logical reasoning and/or mathematics. For example, the logic context system 100 can analyze the language of the prompt and extract one or more logical (or mathematical) problems from the prompt. Relatedly, as used herein, the term "logic prompt" includes or refers to a prompt that involves logical reasoning. In some cases, the logic prompt can involve evaluating relationships, principles, facts, etc., to identify patterns, generate inferences, and derive solutions based on logical principles, logical reasoning, and data.

Additionally, as used herein, the term "classification model" includes or refers to a model (e.g., a machine learning model) that classifies, sorts, and/or categorizes a prompt (and/or portion of a prompt) as logical or mathematical, or a combination of a several models of the same type or of different types. For instance, in one or more cases, the classification model can determine if the prompt or, more specifically, a problem within the prompt deals with or is related to a logical problem or a mathematical problem. In some embodiments, the classification model is a large language model that identifies if the logic context system 100 will utilize logic (or reasoning) principles to solve one or more problems within the prompt and use those solutions to generate the response. In one or more cases, the logic context system 100 can train the classification model on one or more examples to identify types of prompts (e.g., logic or mathematics).

Moreover, as used herein, the term "logic code segment" includes or refers to computer code that provides a set of instructions for a computing device to interpret and execute to perform one or more tasks. In some cases, the logic code segment can have a particular structure and can include one or more constraints defining the conditions, relationships, and/or requirements for one or more variables of one or more problems within the prompt (e.g., logic prompt or mathematic prompt). Relatedly, as used herein, the term "constraints" includes or refers to rules or expressions that specify one or more conditions that must be satisfied within a logical (or mathematical) problem. For example, in one or more embodiments, constraints can encode the limits of the logical (or mathematical) problem. In some cases, the constraints can include mathematical operations or logical functions, such as equalities. A structure can include or define variable types, formatting, memory allocation, and/or organization of software-level commands calling instruction sets or machine-level commands of a processor. In one or more embodiments, the context engine can utilize one or more large language models to generate the logic code segment. Relatedly, as used herein, the term "logical problem" includes or refers to a problem and/or question that requires logic or reasoning to solve. In some cases, a logical problem can be an issue, puzzle (e.g., sudoku), brain-teaser, game (e.g., chess or go), etc., that utilizes deductive, inductive, analogical, cause and effect, etc. reasoning.

As used herein, the term "context engine" includes or refers to a model (e.g., a machine learning model) that includes and/or works in conjunction with one or more large language models to generate a logic code segment for a prompt (e.g., logic prompt or mathematic prompt). For instance, the context engine can break down the prompt into one or more problems (e.g., subcomponents or sub-prompts) and generate logic code segments representing one or more constraints to solve and/or address the one or more problems (e.g., logical or mathematical) found within the prompt. In one or more embodiments, the context engine can be a combination of a several models of the same type or of different types.

As mentioned above, the context engine includes or refers to a machine learning model. In one or more embodiments, a "machine learning model" includes a computer algorithm or a collection of computer algorithms that can be trained and/or tuned based on inputs to approximate unknown functions. For example, a machine learning model can include a computer algorithm with branches, weights, or parameters that change based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks). In one or more embodiments, the machine learning model can be a combination of a several models of the same type or of different types.

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a large language model, a graph neural network, a diffusion neural network, or a multi-layer perceptron. In some embodiments, a neural network includes a combination of neural networks or neural network components.

Along these lines, the logic context system 100 utilizes the context engine to direct and/or interact with one or more large language models. As used herein, the term "large language model" includes or refers to one or more neural networks capable of processing natural language text to generate outputs that range from predictive outputs to analyses or combinations of data within stored content items. In particular, a large language model can include parameters trained (e.g., via deep learning) on large amounts of data to learn patterns and rules of language for summarizing and/or generating digital content. Examples of a large language model include BLOOM, Bard AI, ChatGPT, LaMDA, DialoGPT, DropboxGPT, and Dropbox FileGPT. In one or more embodiments, the large language model can be a combination of a several models of the same type or of different types.

In one or more embodiments, the logic context system 100 can utilize a logic engine to solve the one or more problems within the prompt. As used herein, the term "logic engine" refers to a model that utilizes formulas and/or theories to solve one or more logical and/or mathematical problems. For example, a logic engine can be a satisfiability modulo theories (SMT) solver. In some cases, the logic engine can include an SMT library. In alternative embodiments, the logic engine can include or be a propositional satisfiability solver (SAT), mixed-integer programming (MIP), Theorem Provers, etc. In one or more cases, the logic engine can be a combination of a several models of the same type or of different types.

As indicated above, the logic context system 100 can generate a logic result for the problems within the prompt utilizing a logic engine. As used herein, the term "logic result" includes or refers to an answer, variable, and/or solution that satisfies the constraints outlined in the logic code segment. For example, the logic result can include one or more variables that satisfy the constraints (or conditions) of a mathematical formula or logical theory and/or that solve a problem indicated by, or extracted from, a prompt.

Figure 2:
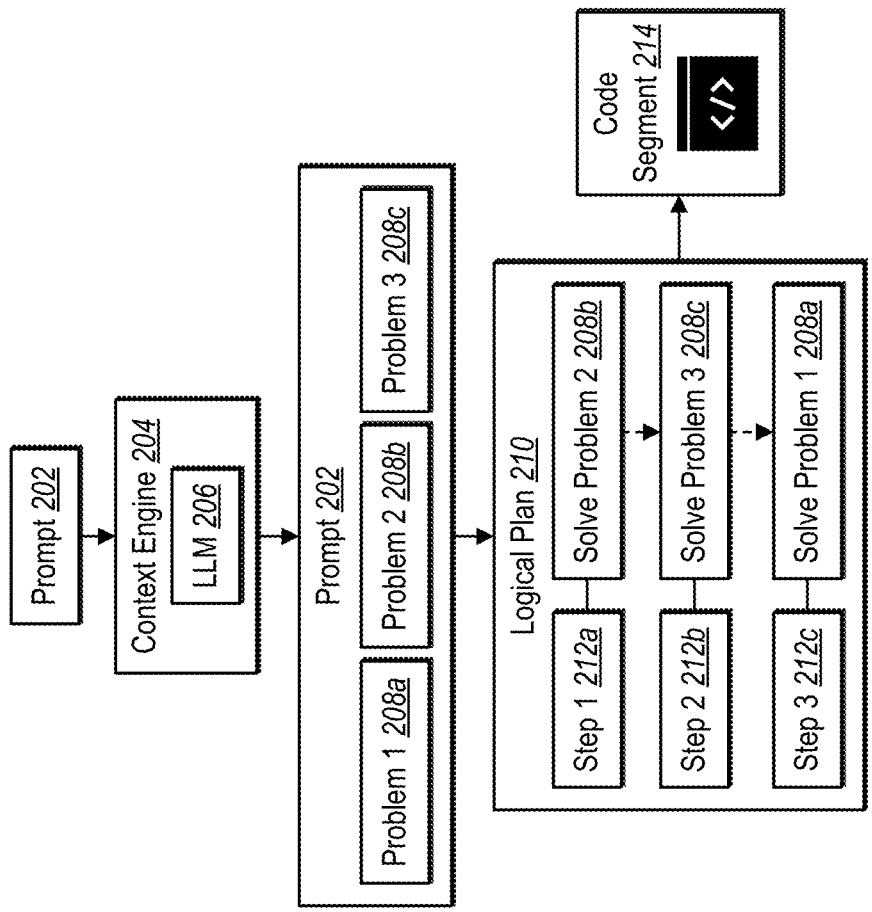
FIG. 2 illustrates a logic context system generating a code segment according to a logical plan in accordance with one or more embodiments.

Turning now to FIG. 2, the logic context system 100 can generate a code segment (e.g., logic code segment or mathematical code segment) by processing a prompt 202. As shown in FIG. 2, the logic context system 100 can generate the code segment according to a logical plan 210 in accordance with one or more embodiments. As shown in FIG. 2, the logic context system 100 can classify a prompt as involving one or more logical problems with a classification model. As shown in FIG. 2, in one or more embodiments, the context engine 204 can process the prompt 202 by utilizing a large language model 206 to identify one or more logical problems within the prompt 202. For instance, as shown in FIG. 1, the large language model 206 can parse out logical problem 1 208a, logical problem 2 208b, and logical problem 3 208c within the prompt 202. In one or more cases, the logical problems 208a-c can be related to each other (e.g., where a result from one is used to generate the result of another in a sequence or series). In some cases, the logic context system 100 can train the context engine 204 to identify logical problems and how to break down the prompt 202 into one or more logical problems by providing one or more examples of logical problems within prompts.

Additionally, in one or more cases, the logic context system 100 can utilize the context engine 204 to determine if other subcomponents (or sub prompts) of the prompt 202 can be addressed without employing the logic engine. For example, if one or more problems (or subcomponents) within the prompt do not involve logic, the logic context system 100 can utilize a large language model or generate a code segment that can be processed without employing a logic engine. Moreover, the context engine 204 can integrate the code for the non-logic subcomponents into the code segment 214 according to the ordered steps of the logical plan 210.

As shown in FIG. 2, the logic context system 100 can generate a logical plan 210, defining the steps and order of performing one or more tasks associated with the prompt 202 and/or solving the logical problems 208a-c within the prompt 202. For instance, as shown in FIG. 2, the logical plan 210 can include step 1 212a, step 2 212b, and step 3 212c indicating the order of solving the logical problems 208a-c. In one or more cases, the large language model 206 can generate the order of the steps 212a-c based on (i) the order of the logical problems within the prompt 202, (ii) identifying the most relevant logical problems, (iii) whether the solution to one of the logical problems feeds into a subsequent logical problem, and/or (iv) the difficulty of solving the logical problems. For example, as shown in FIG. 2, according to the logical plan 210, at step 1 212a, the logic context system 100 can solve problem 2 208b. Subsequently, as outlined by the logical plan 210, the logic context system 100 can solve problem 3 208c at step 2 212b and solve problem 1 208a at step 3 212c.

As shown in FIG. 2 and mentioned above, in one or more embodiments, the logic context system 100 can arrange the ordered steps 212a-c of solving one or more logical problems 208a-c based on the relatedness of the one or more logical problems 208a-c. For instance, as shown in FIG. 2, the solution to solving the logical problem 2 208b can feed into solving the logical problem 3 208c. Likewise, in one or more cases, the result (or solution) of problem 3 208c can aid in solving the logical problem 208a. Indeed, the logic context system 100 can utilize the large language model 206 to generate a logical plan 210 that solves the one or more logical problems 208a-c according to ordered steps that accurately address the one or more logical problems 208a-c within the prompt 202.

Additionally, in some cases, solving the logical problems 208a-c can involve pulling and/or accessing information from one or more source content items stored on a content management system and/or other database. In one or more embodiments, the logical plan can further include steps defining when to access and/or pull information from one or more source content items (e.g., using a RAG approach to assist in generating a logic result). In some cases, the logic context system 100 can utilize the large language model to identify which content items include information relevant to the prompt 202 and/or the one or more logical problems 208a-c and generate the logical plan 210 that determines when and how to utilize that information to solve the logical problems 208a-c. For example, solving the one or more logical problems 208a-c within the prompt, 202 can involve the logic context system 100 identifying and pulling names, rules, relationships, etc., within the source content items to define one or more conditions (or constraints) and one or more variables.

As further shown in FIG. 2, the logic context system 100 can generate a code segment 214 based on the logical plan 210. In particular, the logic context system 100 can generate the code segment 214 (or, more specifically, logic code segment) to include constraints, logical theorems, and one or more variables from the source content items to solve the one or more logical problems 208*a-c* within the prompt. In one or more cases, the large language model 206 can generate the code segment 214 with a particular structure. In some cases, the structure can correspond to a type of programming (or coding) language (e.g., Java, C++, Python, JavaScript, Haskell, etc.). In some cases, the structure of the code segment 214 can correspond to the logic engine. For example, based on the type of logic engine utilized, the logic context system 100 can utilize symbols, characters, layout, etc., in a manner understood and ingestible by the logic engine (or platform of the logic engine). For example, based on utilizing a cvc3 SMT solver, the logic context system 100 can generate the code segment 214 utilizing a structure and/or language corresponding to the cvc3 SMT solver.

In some embodiments, the logic context system 100 can receive additional information in an additional prompt from the client device and modify and/or update the partitioning of the one or more logical problems or order of steps to generate a modified logic code segment.

Figure 3:
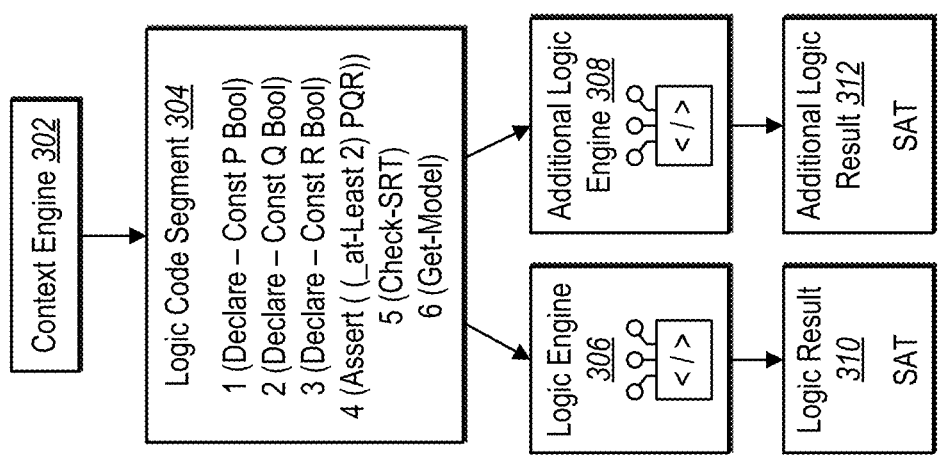
FIG. 3 illustrates a logic context system generating an additional logic result by processing a logic code segment with an additional logic engine in accordance with one or more embodiments.

As just discussed, the logic context system 100 can generate a code segment (or logic code segment) that the logic context system 100 can process with a logic engine. FIG. 3 illustrates a logic context system generating an additional logic result by processing a logic code segment with an additional logic engine in accordance with one or more embodiments. As shown in FIG. 3 and as discussed above, the logic context system 100 can utilize a context engine 302 to generate a logic code segment 304 by processing a prompt (e.g., logic prompt). As shown in FIG. 3, the logic code segment 304 can include one or more variables and constraints (e.g., formulas, rules, and/or conditions) representing the one or more logical problems within the prompt.

As shown in FIG. 3, the logic context system 100 can feed the logic code segment 304 into a logic engine 306. As FIG. 3 illustrates, the logic engine 306 can process the logic code segment 304 to determine which variables satisfy the constraints outlined in the logic code segment 304. In particular, the logic engine 306 determines if the constraints (e.g., formula, relationship, theorem) are true or possible based on the values, representations, and/or configuration of the variables (e.g., P, Q, and R). For instance, as shown in FIG. 3, the logic engine 306 (e.g., SMT solver) can generate a logic result 310, demonstrating that the constraints of the logic code segment 304 are satisfied (e.g., SAT). In some cases, the logic engine 306 can provide the one or more values, results, solutions, etc., of the variables that satisfy or meet the constraints of the logic code segment 304. Additionally, in some cases, the logic context system 100 can provide one or more variables that do not satisfy the constraints.

In one or more embodiments, as further shown in FIG. 3, the logic context system 100 can utilize an additional logic engine 308 to process the logic code segment 304 according to a different structure. For instance, in one or more cases, the logic context system 100 can solve the one or more logical problems with various logic engines that approach problem-solving differently. In some cases, the context engine 302 can generate the logic code segment 304 according to a different structure (or format) corresponding to the additional logic engine 308. As FIG. 3 indicates the additional logic engine 308 can process the logic code segment 304 according to the different structure and generate an additional logic result 312 showing that the values and/or configurations of the one or more variables satisfy (or fulfill) the constraints (e.g., logical constraints) of the logic code segment 304. Indeed, the logic context system 100 can solve the one or more logical problems within the prompt by utilizing various logic engines to process the logic code segment 304 differently.

Figure 4:
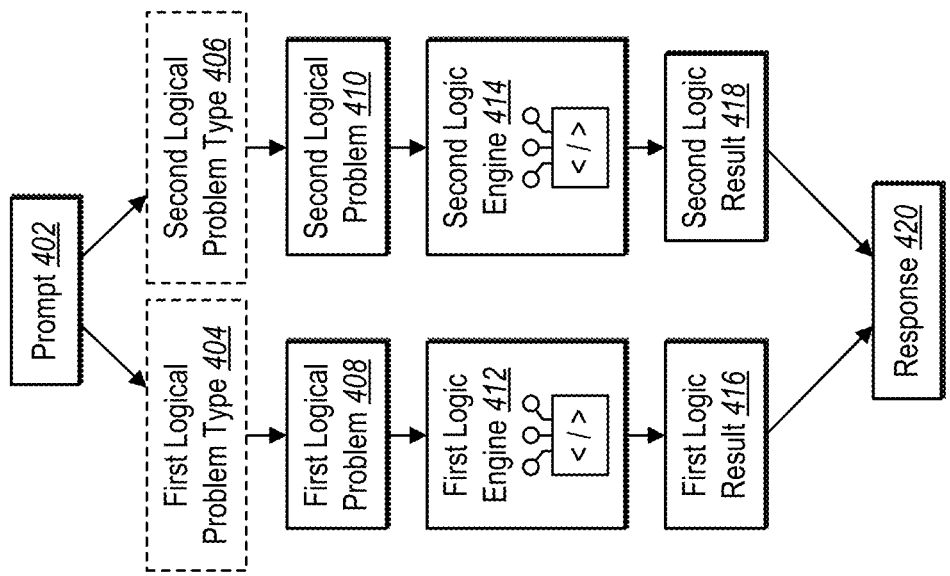
FIG. 4 illustrates a logic context system generating a response for a prompt that includes a first logical problem and a second logical problem in accordance with one or more embodiments.

As just discussed, the logic context system 100 can process logic data code segments representing a logical problem with different structures with different logic engines. In some cases, the logic context system 100 can utilize one or more logic engines to solve various logical problems within a prompt. FIG. 4 illustrates a logic context system generating a response for a prompt that includes a first logical problem and a second logical problem in accordance with one or more embodiments. In particular, FIG. 4 illustrates the logic context system 100, identifying various logical problem types and utilizing multiple logic engines to solve logical problems with different logical problem types.

As shown in FIG. 4, the logic context system 100 can receive a prompt 402 from a client device. In one or more cases, the logic context system 100 can identify and outline one or more logical problems within the prompt 402 (e.g., logic prompt). In some embodiments, the logic context system 100 can further determine the type of logical problem for the one or more logical problems within the prompt. For example, the logic context system 100 can utilize the context engine to determine if the one or more logical problems involve but are not limited to, formal logic, informal logic, fallacies, deductive reasoning, Boolean logic, propositional logic, predicate logic, categorical logic, first-order logic, etc.

As shown in FIG. 4, the logic context system 100 can determine a first logical problem type 404 for a first logical problem 408 and a second logical problem type 406 for a second logical problem 410. For example, the logic context system 100 can determine that the first logical problem 408 is a predicate logical problem type and the second logical problem 410 is a propositional logical problem type. In such cases, different logic engines may be better equipped to solve the first logical problem 408 and the second logical problem 410.

Accordingly, in one or more implementations, the logic context system 100 can utilize a context engine to generate a first logic code segment for the first logical problem 408 and a second logic code segment for the second logical problem 410. In some cases, the first logic code segment for the first logical problem 408 differs in structure, format, constraints, etc., from the second logic code segment for the second logical problem 410. In particular, based on the logical problem type, the logic context system 100 can utilize a logic engine that employs one or more theories that can solve the logical problem type of the logical problem. For example, as shown in FIG. 4, the logic context system 100 can utilize a first logic engine 412 to process the first logic code segment for the first logical problem and a second logic engine 414 to process the second logic code segment for the second logical problem. In some instances, the logic context system 100 can utilize a cvc5 logic engine to process the first logic code segment for the first logical problem 408 and a Z3 logic engine to process the second logic code segment for the second logical problem 410.

As FIG. 4 illustrates, the logic context system 100 can generate a first logic result 416 for the first logical problem 408 and a second logic result 418 for the second logical problem 410. In one or more cases, the logic context system 100 can utilize the first logic result 416 and the second logic result 418 to generate a response 420 to the logic prompt 402. Indeed, the logic context system 100 can utilize the solutions, satisfiability, or model within the first logic result 416 and the second logic result 418 to generate the response 420. In some cases, the logic context system 100 can utilize the first logic result 416 and the second logic result 418, along with information from one or more source content items within the content management system and/or external to the content management system, to generate a response to the logic prompt 402.

Additionally, in one or more embodiments, the logic context system 100 can receive a prompt comprising a logical problem and a mathematical problem. In some cases, the logic context system 100 can identify and/or determine that the prompt includes or refers to a logical problem type and a mathematical problem type. In one or more cases, the logic context system 100 can generate a logic code segment for the logical problem type and a mathematic code segment for the mathematical problem type and input the logic code segment into a logic engine and the mathematic code segment into a mathematic engine. Thus, the logic context system 100 can select one or more logic engines and/or mathematic engines to solve prompts that include various types of logical problems and/or mathematical problems.

Figure 5A:
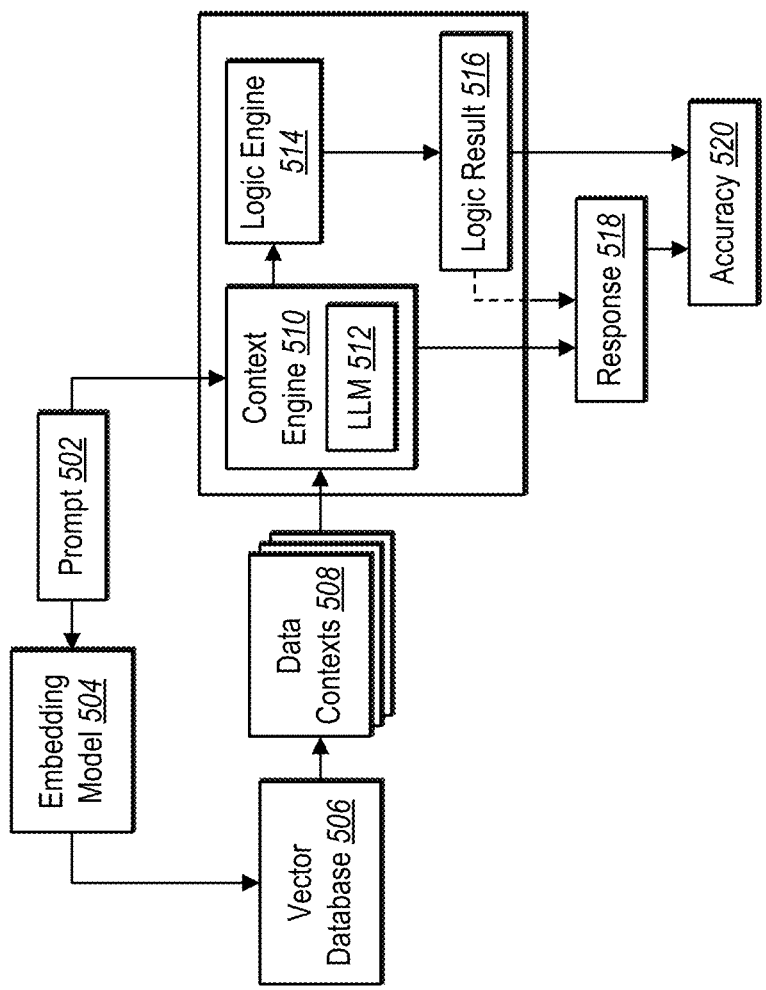
FIGS. 5A-5B illustrate a logic context system verifying the accuracy of a response in accordance with one or more embodiments.
Figure 5B:
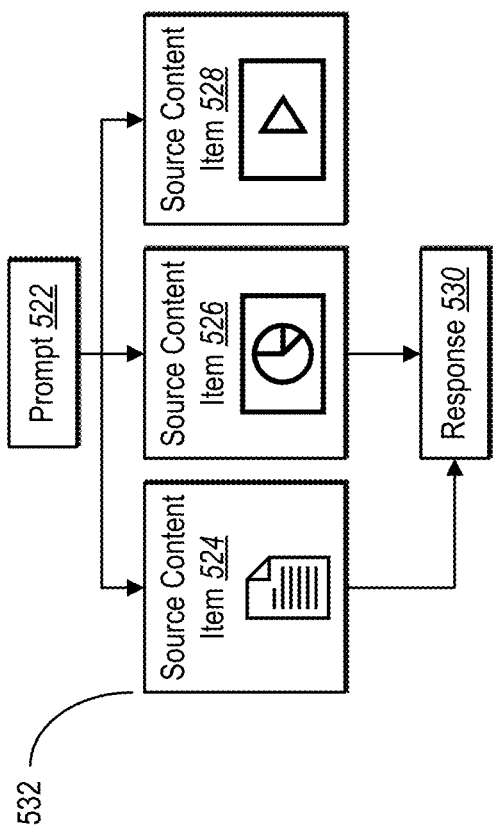

In one or more cases, the logic context system 100 can utilize the context engine and/or the logic engine within other architectures to generate a response to a prompt and verify the accuracy of the response. FIGS. 5A-5B illustrate a logic context system verifying the accuracy of a response in accordance with one or more embodiments. In particular, FIG. 5A shows the logic context system 100 integrating the context engine and the logic engine with a retrieval augmented generation (RAG) system to generate an accurate response to a prompt in accordance with one or more embodiments.

As shown in FIG. 5A, the logic context system 100 can receive a prompt (e.g., logic prompt or mathematic prompt) from a client device. As part of the RAG model, the logic context system 100 can input the prompt into an embedding model 504 to generate one or more prompt embeddings. As shown in FIG. 5A, the logic context system 100 can compare the one or more prompt embeddings (or vectorized segments) with one or more vectorized segments of one or more source content items associated with a user account on a content management system stored within a vector database 506. Based on comparing the prompt embeddings with the one or more vectorized segments, the logic context system 100 can generate one or more data contexts 508 with data relevant to the prompt 502. In some cases, the one or more data contexts 508 can include conditions, formulas, variables, subjects, data, etc., that, in part, support the constraints processed by a logic engine 514.

As shown in FIG. 5A, the logic context system 100 can feed the prompt 502 and the one or more data contexts 508 into a context engine 510 comprising (or working in conjunction) with a large language model 512. As indicated in FIG. 5A, the logic context system 100 can process the prompt 502 and the one or more data contexts 508 with the context engine 510 to generate a logic code segment (or mathematic code segment) with a structure that corresponds to the logic engine 514. In one or more embodiments, the context engine 510 and/or large language model 512 can utilize the one or more data contexts 508 and the prompt 502 to generate a logic code segment that includes relevant information and the structure to answer the prompt in a personalized and accurate manner for a user account. For example, based on the prompt, the logic context system 100 can utilize the embedding model 504 and the vector database 506 to generate one or more data contexts 508 that feed relevant, important, and/or related information to the context engine 510 and/or the large language model 512. In some cases, the context engine 510 and/or the large language model 512 can process the prompt 502 and the one or more data contexts 508 to generate the logic code segment with computer language to feed into the logic engine 514.

As just mentioned, and as further shown in FIG. 5A, the logic context system 100 can process the logic code segment with the logic engine 514. In particular, as described above, the logic engine 514 can generate a logic result 516, indicating that the variables and/or constraints within the logic code segment are satisfied (e.g., true). For example, based on the prompt requesting a solution to a logical problem, the logic engine 514 can generate a logic result 516 that includes the solution and/or variables that lead to the constraints within the logic code segment being true, valid, or satisfied.

As further shown in FIG. 5A, the logic context system 100 can generate a response 518 to the prompt 502. In particular, the logic context system 100 can utilize the values within the logic result 516 and the large language model 512 and/or additional large language model to generate the response 518 with accurate information from the logic result 516. Indeed, the logic context system 100 can combine the information from the logic result 516, the prompt 502, and/or the one or more data contexts 508 to generate the response 518.

As FIG. 5A indicates the logic context system 100 can utilize the context engine 510 to prove the accuracy 520 of the response 518. As indicated above, solely relying on large language models to generate a response that involves solving a logical (or mathematical problem) leads to systems generating inaccurate results inefficiently. For instance, while attempting to generate a response to a prompt that includes or defines one or more logical problems, some existing large language models get stuck in a loop of pulling information without a high level of confidence that the information in the response is correct. Unlike such systems, the logic engine 514 provides confidence that solutions (e.g., logic results) to one or more logical problems within the prompt 502 are correct (or accurate) because the logic engine 514 can ensure that the variables satisfy the constraints defined by the one or more logical problems within the prompt 502. For example, the context engine 510 can generate the logic code segment that represents the one or more logical problems within the prompt 502. In one or more cases, the logic engine 514 can utilize a series (or library) of theorems, formulas, statements, etc., to generate a function that addresses the one or more logical problems within the prompt 502. The logic engine 514 can process (or solve) the function comprising one or more constraints to determine if any variables satisfy the constraints outlined in the function. Because the logic engine 514 can verify the accuracy of the logic result 516, the logic context system 100 can ensure the accuracy 520 of the response. Indeed, as long as the prompt 502 accurately outlines the one or more logical problems, the logic engine 514 can return a logic result 516 that accurately solves the one or more logical problems 100% of the time. Systems relying solely on large language models cannot provide that degree of accuracy when generating a result or response to a logical (or mathematical) problem.

In one or more alternative embodiments, the logic context system 100 can implement the context engine, logical engine, and/or mathematical engine in other frameworks (e.g., closed-loop language learning, ReAct, tool-augmented generative models, knowledge-augmented generation, neural-augmented retrieval, etc.) to validate the accuracy of a response.

To further show the accuracy of the logic context system 100 employing the context engine and the logic engine, the logic context system 100 in one or more implementations can verify the accuracy of a response by generating a dependency graph. As shown in FIG. 5B, the logic context system 100 can generate a dependency graph 532 showing the relationship between the prompt 522, the one or more source content items 524, 526, 528 (or information found within the one or more source content items 524, 526, 528), and/or a response 530. For example, the dependency graph 532 can show that the response 530 to the prompt 522 depends on information (e.g., variables and/or conditions) from the source content item 524 and the source content item 526.

To further illustrate, in one or more cases, the logic context system 100 can receive the prompt 522 requesting to find all of the interrelations for all of the work tasks for a user group (or user account) within an organization (or entity) for an upcoming time period (e.g., year, month, week, etc.). In some cases, limitations, schedules, roles, functions, budgets, etc., of the individuals within the user group as outlined by the one or more source content items 524, 526 can lead to an order of operation restrictions, limited configurations of individuals working on certain work tasks, and/or conflicts between tasks and/or individuals within the group which can lead to one or more logical problems on how and when to perform work tasks. In one or more cases, the logic context system 100, via the context engine, can generate a logic code segment outlining the restrictions and/or conflicts (e.g., constraints). In some cases, the logic context system 100 via the logic engine can process the logic code segment and generate the dependency graph 532, showing how to address conflicts and/or assign tasks to individuals within the user group. Indeed, the dependency graph 532 can show dependencies affecting work task assignments to certain individuals within the user group. As discussed above, the satisfaction of the one or more constraints that solve the one or more logical problems within the prompt, proves the validity and/or accuracy of the information (or solutions) within the response 530.

Figure 6:
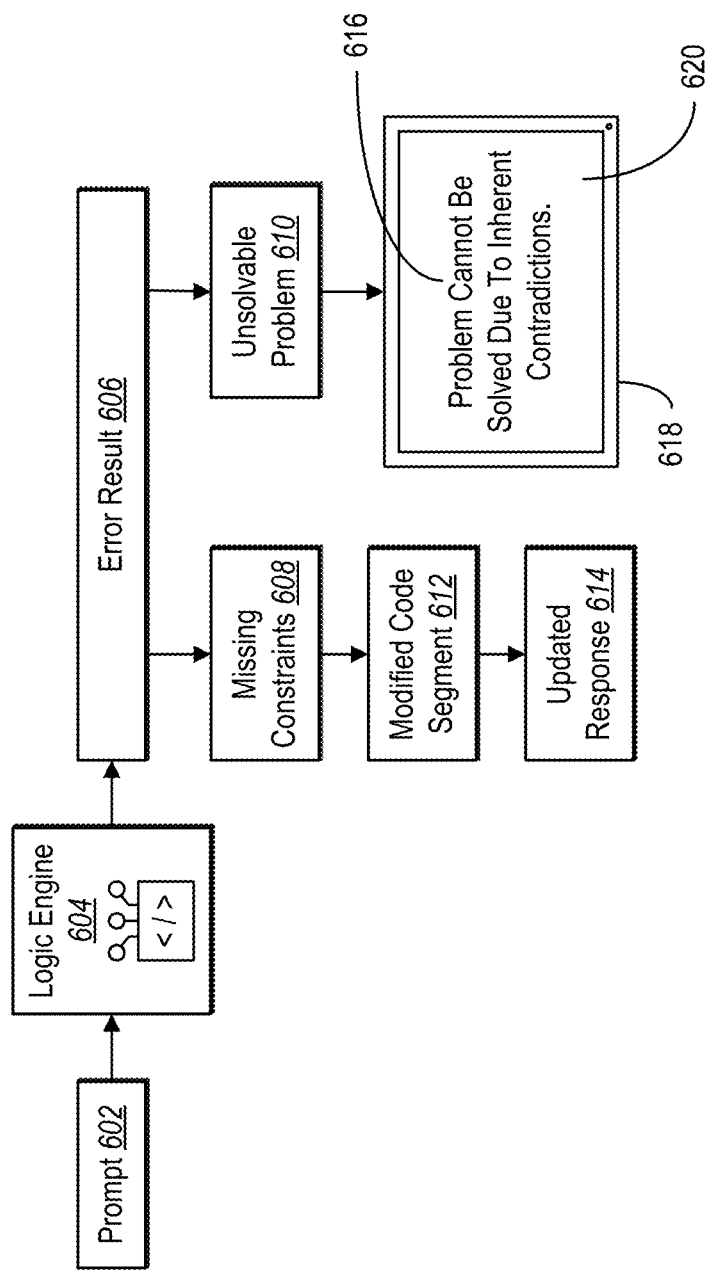
FIG. 6 illustrates a logic context system generating an error result based on one or more missing constraints or an unsolvable problem within a prompt in accordance with one or more embodiments.

Turning now to FIG. 6, the logic context system 100 can determine if conditions related to the one or more logical problems are true and/or valid. In some cases, the logic context system 100 can return a logic result showing that one or more logical problems are unsolvable or require more information to solve. FIG. 6 illustrates the logic context system 100 generating an error result based on one or more missing constraints or an unsolvable problem within a prompt in accordance with one or more embodiments.

As shown in FIG. 6 and as discussed above, the logic context system 100 can receive a prompt 602 (e.g., logic prompt) and generate a logic code segment by processing the prompt 602 (e.g., logic prompt) with the context engine. In one or more cases, while processing the logic code segment, a logic engine 604 can generate an error result 606 based on the logic engine 604 determining that no variables satisfy the one or more constraints within the function addressing the one or more logical problems within the prompt.

As shown in FIG. 6, the logic engine 604 can generate the error result 606 based on one or more missing constraints 608 within the logic code segment. In particular, the logic engine 604 can determine that a logic (or mathematic) constraint (e.g., rule and/or condition) addressing (or solving) one of the logical (or mathematical) problems within the prompt 602 is missing or misstated. In some cases, the logic context system 100 can generate an error message identifying the one or more missing constraints 608 and request additional information via an additional prompt from the client device associated with a user account. Based on receiving the additional information, the logic context system 100 can generate a modified code segment 612 (e.g., modified logic code segment or modified mathematic code segment) that includes the missing logic code constraints. In some cases, the error message can include one or more constraint suggestions to address the missing information. Based on receiving an indication of a selection of the one or more constraint suggestions, the logic context system 100 can generate the modified code segment 612. Additionally, in some cases, the logic context system 100 can generate a modified prompt by updating the prompt with the missing information (e.g., constraints). In some cases, the logic context system 100 can generate the modified code segment by processing the modified prompt with the context engine.

As FIG. 6 illustrates, the logic context system 100 can generate an updated response 614 by processing the modified code segment 612. In particular, the logic engine 604 can process the modified code segment 612 and generate an updated logic result (or mathematic result). In some implementations, the logic context system 100 can utilize the updated logic result to inform, in part, the updated response 614.

In some cases, as shown in FIG. 6, the error result 606 can indicate that the prompt recites an unsolvable problem 610. For example, in some cases, the unsolvable problem 610 recites one or more constraints that cannot be satisfied by any variables and remain true. In such instances, the logic context system 100 can provide for display on a graphical user interface 620 of a client device 618 a message 616 indicating that one of the logical problems within the prompt is an unsolvable problem 610 and the reason why the logic engine 604 cannot generate a solution to the unsolvable problem 610. For example, as shown in FIG. 6, the message 616 can indicate that the logic engine 604 cannot provide a solution because the unsolvable problem 610 includes one or more constraints with inherent contradictions.

Figure 7:
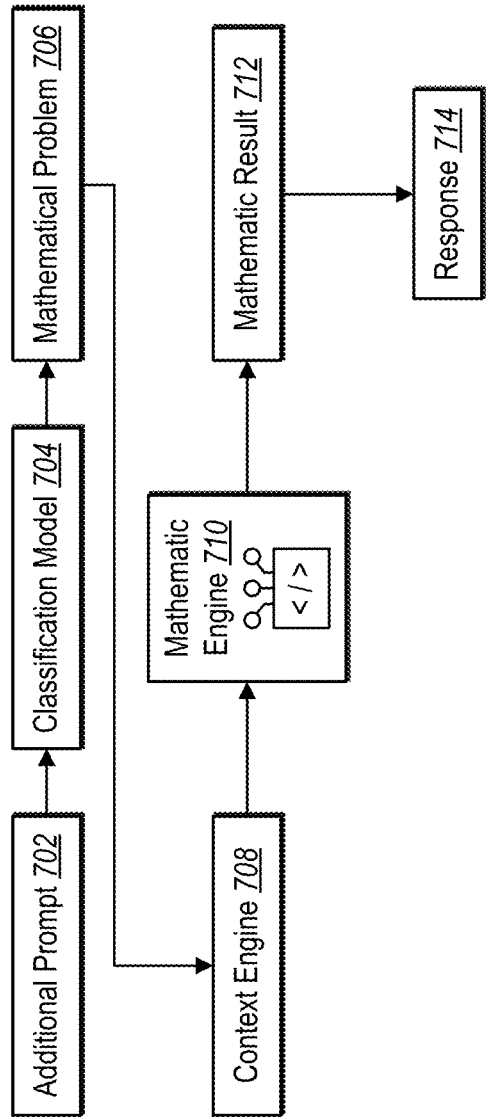
FIG. 7 illustrates a logic context system generating a response for a mathematical problem within a prompt in accordance with one or more embodiments.

As discussed above, the logic context system 100 can address logical problems that require various types of logic (e.g., reasoning) to solve. In one or more cases, the logic context system 100 can also address mathematical problems. FIG. 7 illustrates the logic context system 100 generating a response for a prompt involving one or more mathematical problems in accordance with one or more embodiments. As shown in FIG. 7, in one or more cases, the logic context system 100 can receive, from a client device, an additional prompt 702. As described above, in one or more cases, the logic context system 100 can analyze the additional prompt 702 with a classification model 704 and identify the additional prompt 702 includes or defines one or more mathematical problems 706. In some cases, a mathematical problem involves numbers, mathematical proofs, calculations, and/or mathematical formulas. For example, the logic context system 100 can receive a prompt requesting the number of remaining days before a certain contract expires. In one or more embodiments, the classification model 704 can determine that the additional prompt 702 involves one or more mathematical problems 706 because it requires arithmetic or subtraction between two dates (e.g., the current data and the expiry date of the contract). In some cases, the logic context system 100 can classify the additional prompt 702 as a mathematical prompt because it involves the one or more mathematical problems 706.

As shown in FIG. 7, the logic context system 100 can process the one or more mathematical problems 706 utilizing the context engine 708 to generate a mathematic code segment. In one or more cases, the mathematic code segment can include one or more constraints (e.g., mathematic constraints) outlining the information or conditions found within the one or more mathematical problems 706. Building upon the example given above, the mathematical constraints can include identifying the current data, the expiry date of the contract, and finding the difference between the two. As another example, a mathematical constraint can indicate that three unknown variables do not have the same value. As discussed above, the mathematic code segment can include computer language (e.g., SMT-LIB standard) outlining the conditions of the one or more mathematical problems 706 (e.g., calculus, linear algebra, trigonometry, arithmetic, probability, differential equations, etc.) and a given structure that is compatible with the mathematic engine 710.

As shown in FIG. 7, the logic context system 100 can generate a mathematic result 712 by processing the mathematic code segment with the mathematic engine 710. As described above, in some cases, the mathematic engine can be an SMT solver or SMT library that utilizes one or more mathematical theories, formulas, etc., to solve the one or more mathematical problems. For example, based on finding the source content item (e.g., contract) with the expiry date, determining the current date, and generating mathematical constraints about the expiry date and current data, the logic context system 100 can determine that the number of remaining days before the given contract expires. As indicated by the example above, the mathematic result 712 can include one or more numbers or formulas that satisfy the constraints of the one or more mathematical problems.

As further shown in FIG. 7, the logic context system 100 can generate a response 714 based, in part, on the mathematic result 712. For instance, the logic context system 100 can provide a number of remaining days before the given contract expires. In some cases, the logic context system 100 can receive a prompt with both mathematical and logical problems. In one or more embodiments, the logic context system 100 can utilize a combination of logic code segments, mathematic code segments, logic engines, and/or mathematic engines to generate results (e.g., logic results and/or mathematic results) to inform a response 714 to a prompt.

In one or more embodiments, a prompt can include information related to time. Some conventional systems that utilize large language models to answer prompts are not able to process, understand, and/or account for references of time within the prompt. The logic context system 100 can utilize the context engine to enable the system to accurately address and resolve prompts that involve time. For example, logic context system 100 can improve accuracy by employing time resolution techniques for determining dates and/or times. For instance, the logic context system 100 can utilize the context engine, the large language model, and an interpreter engine to identify references to time within a prompt and accurately generate responses (e.g., perform tasks) informed by the reference to time within the prompt. As discussed above, the improve accuracy results in computational efficiency because, unlike conventional systems that generate inaccurate results, the logic context system 100 does not waste resources reprocessing prompts to generate an accurate response to the prompt.

Figure 8:
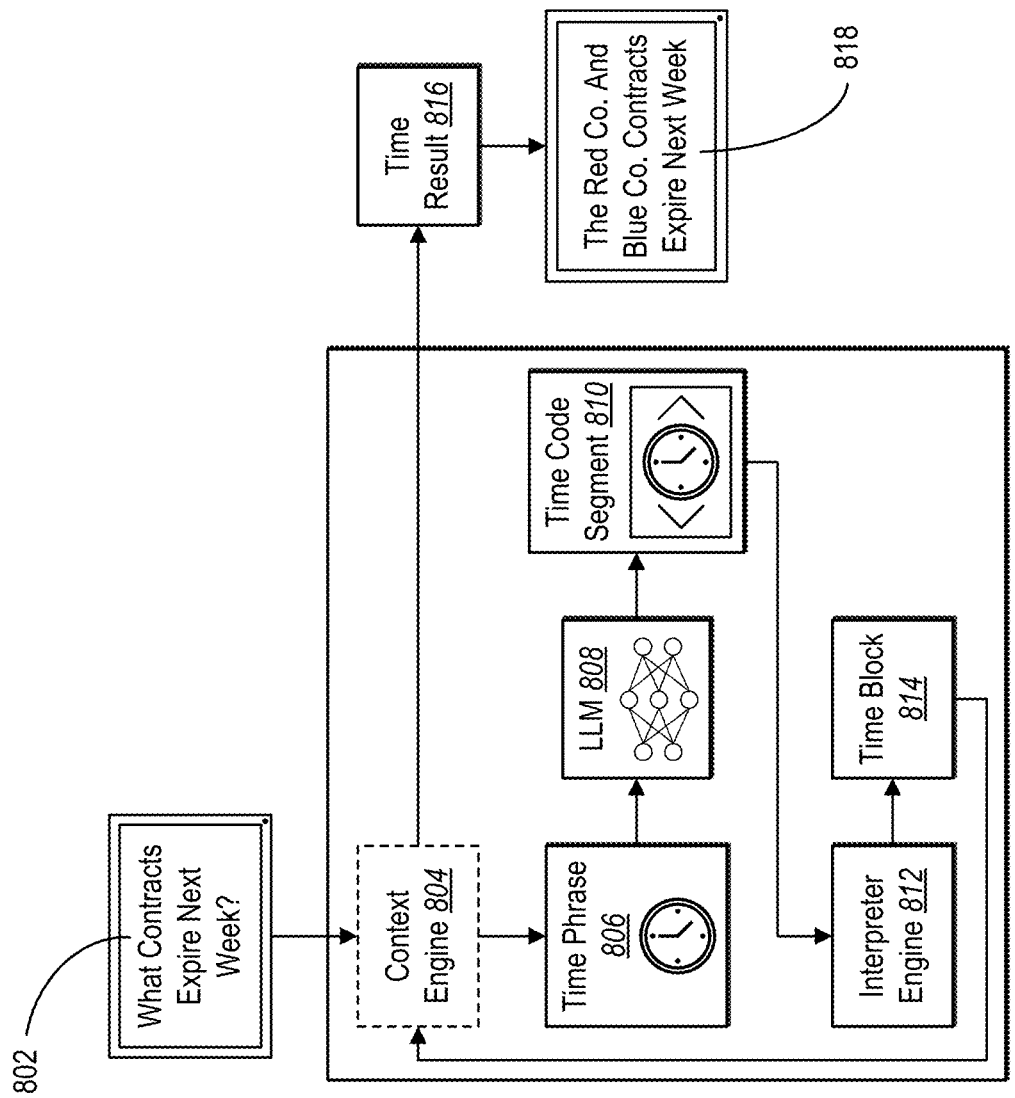
FIG. 8 illustrates a logic context system utilizing a context engine to determine a time result for a prompt in accordance with one or more embodiments.

FIG. 8 illustrates the logic context system 100 identifying a time phrase in the prompt, generating a time result for the time phrase, and generating a response based in part, on the time result in accordance with one or more embodiments. As just mentioned, in some cases, the prompt 802 can include references to time such as a future event, past event, date, time period, etc. In some cases, the time phrase within the prompt 802 can be in relation to the time and/or moment of receiving the prompt 802. For example, the prompt 802 reciting "What contracts expire next week?" can include determining the following week in relation to the time and/or date of receiving the prompt 802. In some cases, the time phrase 806 within the prompt can be independent of the time of receiving the prompt 802.

Additionally, in one or more cases, the time phrase 806 can be implicit or explicit within the prompt 802. In one or more implementations, an implicit time phrase can include a time, date, etc. that takes some analysis to determine or extract from the prompts 802. For example, the prompt 802 referring to "next week" implicitly includes seven days and/or implicitly designates a series of dates occurring in the week after the current date (e.g., from next Sunday to its following Saturday). In one or more implementations, the logic context system 100 can identify phrases or terms that mention, involve, and/or reference time to determine the time phrase 806. For instance, a context engine 804 can analyze the prompt 802 and extract the time phrase 806 (e.g., next week). In some cases, the context engine 804 can be trained to identify time phrases based on one or more examples of time phrases (e.g., dates, times, periods of time).

In one or more embodiments, the prompt 802 can explicitly state the time phrase 806. For example, the prompt 802 can request to schedule a team meeting at 1:30 on Jan. 17, 2025, and explicitly provide a time or period of time. In one or more embodiments, the logic context system 100 can translate the time phrase 806 into a standard time format (e.g., coordinated universal time). In one or more cases, the logic context system 100 can account for time zones, daylight savings, date formatting, and/or time formatting to generate a standard time format for the time phrase 806.

As further shown in FIG. 8, the logic context system 100 can input the time phrase 806 into a large language model 808. In one or more cases, the large language model 808 can process the time phrase 806 to generate a time code segment 810 (e.g., based on an instruction that accompanies the time phrase 806 provided to the large language model 808). In one or more embodiments, the time code segment 810 can be executable computer language or programming language that represents a time function that utilizes the time phrase 806 to determine a time (e.g., time block) related to generating a response 818 (e.g., performing a task) for the prompt 802.

As further shown in FIG. 8, the system can further process the time code segment 810 with an interpreter engine 812 (or, more simply, an interpreter). In one or more cases, the interpreter engine 812 can refer to software or an application program that reads and executes computer code (e.g., source code) written in a high-level programming language. For example, the interpreter engine 812 can execute the time code segment 810 to generate the time block 814. In one or more cases, the time block 814 can represent a time, date, and/or period of time related to answering a question, addressing a problem, and/or performing a task within the prompt 802. In some cases, the time block 814 can include two time stamps representing the start of the time block 814 and the end of the time block 814. For example, the time block 814 for the time phrase 806 "next week" can include two time stamps representing all of the dates (e.g., days) for the week following the day of receiving the prompt 802. In some instances, based on the context of time phrase 806 within the prompt 802, the interpreter engine 812 can generate a single time stamp for a single specific time instead of two for the time block 814 for a period of time by processing the time code segment 810.

As further shown in FIG. 8, the logic context system 100 can provide the time block 814 to the context engine 804. In one or more embodiments, the logic context system 100 can provide a concrete data type (e.g., time block 814 or time stamp) to the context engine 804 where the context engine 804 can generate a time result based on the time block 814. In one or more cases, the time result 816 matches the time block 814. Moreover, in one or more implementations, the format of the time result 816 can match or differ from the time block 814. As FIG. 8 indicates, the logic context system 100 can generate a response 818 based in part on the time result 816. For example, as shown in FIG. 8, the response 818 shows that "The Red Co. and Blue Co. contracts expire next week." In some cases, the logic context system 100 can utilize an additional large language model and/or other agents (e.g., logic engine or mathematic engine) to generate the response 818.

Figure 9:
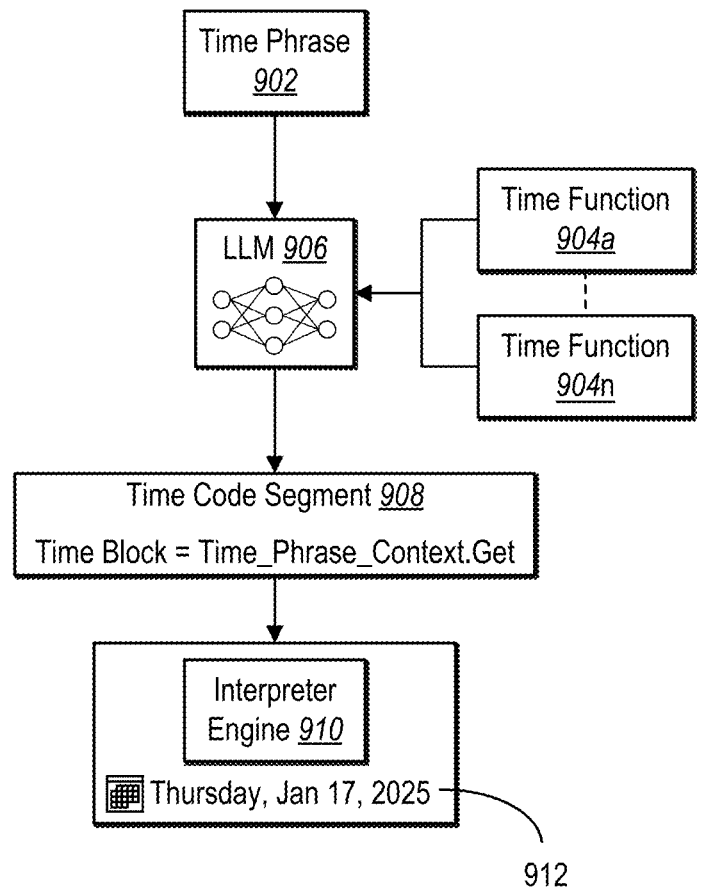
FIG. 9 illustrates a logic context engine utilizing a large language model with one or more time functions to generate a time result in accordance with one or more embodiments.

As just discussed, the logic context system 100 can generate a time code segment to determine a time block. FIG. 9 illustrates a logic context system 100 utilizing a large language model with one or more time functions to generate a time result in accordance with one or more embodiments. As shown in FIG. 9, the logic context system 100 can extract a time phrase 902 from a prompt. In one or more cases, the logic context system 100 can input the time phrase 902 into a large language model 906 to generate a time code segment 908 related to the time phrase 902.

In one or more embodiments, the logic context system 100 can utilize one or more time functions 904a-n with the large language model 906 to generate the time code segment 908. For instance, a time function 904a can be a code block provided to the large language model 906 as an example for determining a time block. Indeed, the logic context system 100 can include or provide examples in the form of one or more time functions for determining different time blocks and/or time stamps (e.g., for training or fine tuning the large language model 906). For instance, the one or more time functions 904a-n can serve as building blocks to the large language model 906 for generating the time code segment 908, where the large language model 906 uses a time function as a template to generate code from a particular phrasing or structure within the time phrase 902.

In some cases, a time function can correspond to code that shifts dates. For example, a time phrase can request identifying an available time for a meeting in 10 days from yesterday. In one or more embodiments, the one or more time functions 904a-n can include code for determining the date of yesterday and moving forward 10 days. Indeed, the logic context system 100 can include one or more time functions 904a-n for determining various dates, time blocks, time stamps, etc. For example, the logic context system 100 can receive a prompt requesting an exact time of when an individual says a certain word in a content item (e.g., streaming video file or audio file). In some cases, the logic context system 100 can utilize a time function that identifies a timestamp (e.g., specific time).

As just mentioned in some cases, the logic context system 100 can provide the large language model 906 the time function 904a (e.g., code for the time function) that corresponds to the time phrase 902. For example, a prompt can request to pull all received emails from the previous month, where the time phrase 902 for the prompt would be the previous month. The logic context system 100 can pull the time function 904a that corresponds to determining the time block for the previous month and provide the time function to the large language model 906. In some cases, the logic context system 100 can receive and/or store examples of the one or more time functions 904a-n.

In one or more embodiments, where the logic context system 100 does not have a time function that corresponds to the time phrase 902, the large language model 906 can utilize the one or more time functions 904a-n to generate a modified time function. For example, the large language model 906 can modify aspects of the one or more time functions 904a-n related to the time phrase 902 to generate the modified time function. Indeed, the one or more time functions 904a-n can act as building blocks for context engine and/or the large language model 906 for time resolution.

As further shown in FIG. 9, the logic context system 100 can generate the time code segment 908. In particular, the large language model 906 can generate the time code segment 908 utilizing the large language model 906 and the one or more time functions 904a-n. Moreover, in some implementations, the time code segment 908 can include one or more functions. For example, the time code segment 908 can include code (e.g., user function) for identifying a user account associated with the prompt and code (e.g., time function) for determining the time block 912 from the time phrase 902. Moreover, in one or more embodiments, the time code segment 908 can include multiple time functions 904a-n for determining the time block 912.

As further shown in FIG. 9, the logic context system 100 can provide the time code segment 908 to an interpreter engine 910. In particular, the interpreter engine 910 can execute the time code segment 908 to determine a time block 912 that corresponds to the time phrase 902 from the prompt. For example, the interpreter engine 910 can identify the user account associated with the prompt by executing a first line of code within the time code segment 908 and determine the time block 912 by executing the following line of code within the time code segment 908. As FIG. 9 illustrates, the logic context system 100 can generate the time block 912 for the time phrase. In some cases, the time block can cover a range of time. For example, the time block 912 associated with the time phrase 902 is a date for Thursday, Jan. 17, 2025.

Figure 10:
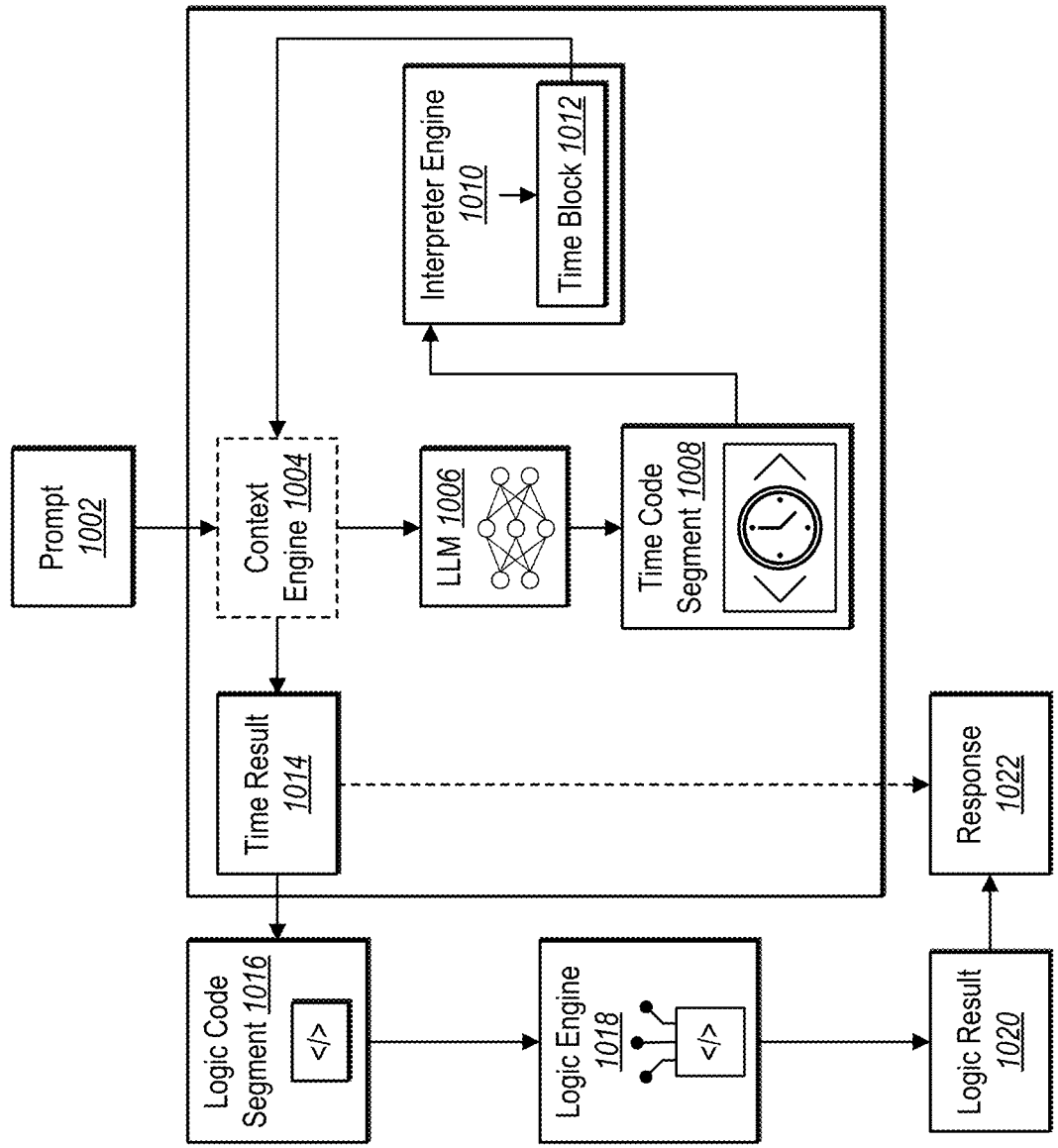
FIG. 10 illustrates the logic context system utilizing a logic result and time result to generate a response to a prompt in accordance with one or more embodiments.

In some embodiments, the logic context system 100 can utilize time phrase resolution as part of many different downstream response generation processes. In particular, the logic context system 100 can utilize a context engine to resolve a time phrase in a prompt as part of generating a response using a logic engine and/or additional large language models. FIG. 10 illustrates the logic context system 100 utilizing a logic result and time result to generate a response to a prompt in accordance with one or more embodiments.

As shown in FIG. 10, the logic context system 100 can receive a prompt 1002 from a client device. In one or more embodiments, the prompt 1002 can include one or more logical problems and/or time phrases. In such instances, the logic context system can determine that the prompt 1002 involves one or more logical (or mathematical) problems and one or more time phrases. In some cases, the logic context system 100 can determine the necessity of a time result 1014 in solving and/or answering the one or more logical problems within the prompt 1002. In one or more cases, the logic context system 100 can determine the time result 1014 and include the time result 1014 within the logic code segment 1016 that, when executed by a logic engine 1018, can solve the one or more logical problems within the prompt 1002.

As discussed above, the context engine 1004 can receive the prompt 1002 and determine a time phrase from the prompt 1002. As FIG. 10 shows, the large language model 1006 can generate a time code segment 1008 that includes programming language for determining a time block that corresponds to the time phrase. Moreover, an interpreter engine 1010 can execute the time code segment 1008 and generate a time block 1012 (or a timestamp) that represents the time (e.g., date, time period, and/or time) associated with the time phrase within the prompt 1002. IN one or more cases, the context engine 1004 can receive the time block 1012 and generate the time result 1014 that can be used for generating a response 1022.

As just mentioned, the logic context system 100 can use the time result 1014 to generate the response 1022 for the prompt 1002. As shown in FIG. 10, the logic context system 100 can use the time result 1014 within a logic code segment 1016. In particular, if the prompt 1002 includes one or more logical problems informed by time, the logic context system 100 can use the time result 1014 to solve the one or more logical problems. For example, the prompt 1002 can request the best time to book a flight between Los Angeles and New York the following week for a user associated with the user account based on their existing schedule. Based on the prompt 1002 including a logical problem (e.g., finding the best time to book the flight) and a time phrase (e.g., the following week), the logic context system 100 can pull in multiple agents (e.g., engines) to perform the task requested within the prompt 1002. For example, the logic context system 100 can utilize the context engine 1004, large language model 1006, and interpreter engine 1010 to determine flight information for a flight from Los Angeles to New York City and include the flight information as a time result 1014 (or multiple time results) within the logic code segment 1016.

In one or more embodiments, the logic code segment 1016 can include the time result 1014 as a constraint along with other information (e.g., conditions) associated with the one or more logical problems within the logic code segment 1016. As shown in FIG. 10, a logic engine 1018, as described above, can process (or execute) the logic code segment 1016 and solve the one or more logical problems within the prompt 1002 to generate a logic result 1020. For example, the logic result 1020 can show that scheduling a flight from Los Angeles to New York on a Tuesday morning satisfies the schedule conditions of the user account. As further shown in FIG. 10 and as described above, the logic context system 100 can generate a response 1022 based in part, on the logic result 1020.

Additionally, in some cases the prompt 1002 will include a time phrase that is not related to one or more logical problems within the prompt 1002. In one or more implementations, the logic context system 100 can generate the time result 1014 for the time phrase within the prompt 1002 and the logic result 1020 for the one or more problems within the prompt 1002 can combine the logic result 1020 and the time result 1014 to generate the response 1022 that addresses the one or more logical problems and the time phrase within the prompt 1002.

Moreover, in some cases, the logic context system 100 can include steps in a logical plan that relate to the time phrase in the prompt 1002. For example, the logic context system 100 can generate the logical plan with ordered steps of resolving the time phrase and solving the one or more logical problems within the prompt 1002. To illustrate, the logic context system 100 can determine the need for the time result 1014 to answer the logical problem. Moreover, the logic context system 100 can order the steps within the logical plan to generate the time result 1014 before solving the logical problem.

FIGS. 1-10, the corresponding text and the examples provide a number of different systems and methods for generating a response to a prompt by utilizing a context engine and a logic engine. In addition to the foregoing, implementations can also be described in terms of flowcharts comprising acts/steps in a method for accomplishing a particular result. For example, FIG. 11 illustrates an example flowchart of a series of acts for generating a response to a prompt classified as a logic prompt in accordance with one or more embodiments.

Figure 11:
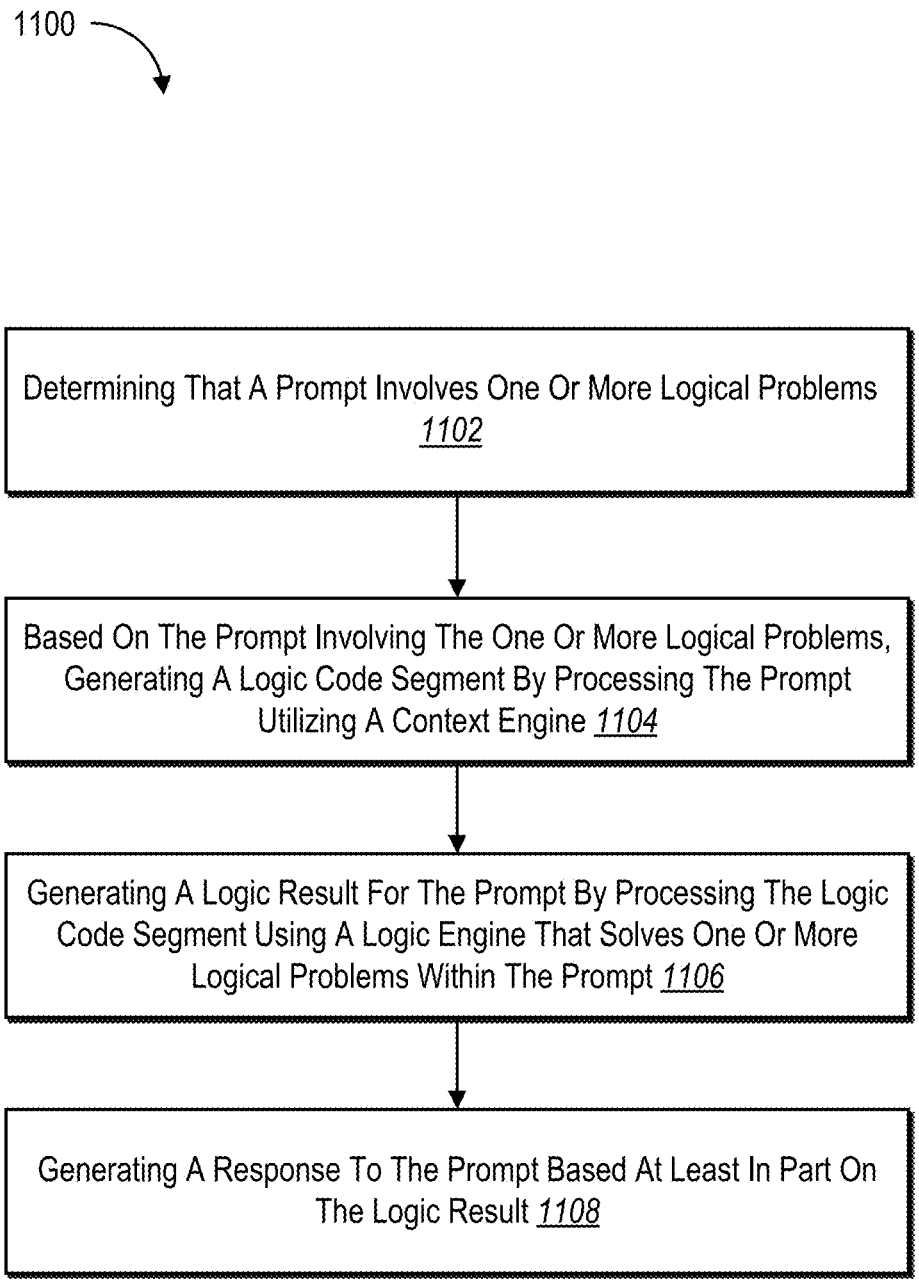
FIG. 11 illustrates an example flowchart of a series of acts for generating a response to a prompt that includes a logical problem in accordance with one or more embodiments.

As illustrated in FIG. 11, the series of acts 1100 may include an act 1102 of determining that a prompt involves one or more logical problems. For example, in one or more embodiments, the act 1102 can include determining, utilizing a prompt classification model, that a prompt received from a client device involves one or more logical problems. In addition, the series of acts 1100 includes an act 1104 of based on the prompt involving the one or more logical problems, generating a logic code segment by processing the prompt utilizing a context engine. For example, in one or more embodiments, the act 1104 can include based on determining that the prompt involves the one or more logical problems, generating a logic code segment by processing the prompt utilizing a context engine comprising one or more large language models. In addition, the series of acts 1100 includes an act 1106 of generating a logic result for the prompt by processing the logic code segment using a logic engine that solves one or more logical problems within the prompt. For instance, in some implementations, the act 1106 can include generating a logic result for the prompt by processing the logic code segment using a logic engine that solves one or more logical problems within the prompt according to a structure of the logic code segment. As further illustrated in FIG. 11, the series of acts 1100 includes an act 1108 of generating a response to the prompt based at least in part on the logic result. For example, act 1108 can include generating a response to the prompt based at least in part on the logic result.

Further, in one or more embodiments, the series of acts 1100 includes an act of receiving, from the logic engine, an error result for the prompt. Additionally, the series of acts 1100 includes an act of generating, based on the error result, a modified logic code segment by determining missing logic constraints in the logic code segment for solving the one or more logical problems within the prompt using the logic engine. In one or more implementations, the series of acts 1100 can include an act of generating an updated logic response for the prompt by processing the modified logic code segments using the logic engine.

Additionally, the series of acts 1100 can include generating, utilizing the context engine, a logical plan partitioning the prompt into the one or more logical problems. In some cases, the series of acts 1100 can include based on the logical plan, generating the logic code segment that solves the one or more logical problems within the prompt.

Moreover, in one or more embodiments, the series of acts 1100 can include an act of generating an additional logic result from the prompt by processing the logic code segment using an additional logic engine that solves the one or more logical problems within the prompt according to a different structure of the logic code segment.

Further, in one or more embodiments, the series of acts 1100 includes generating a first logic result utilizing a first logic engine to solve a first logical problem within the prompt. Moreover, the series of acts 1100 includes generating a second logic result utilizing a second logic engine to solve a second logical problem within the prompt. In addition, the series of acts 1100 can include generating the response to the prompt based at least in part on the first logic result and the second logic result.

In addition, the series of acts 1100 can include generating the response to the prompt with a retrieval augmented generation (RAG) system based at least in part on one or more source content items associated with a user account of a content management system. In one or more cases, the series of acts 1100 includes determining an accuracy of the response based on the logic result for the prompt.

Moreover, in one or more embodiments, the series of acts 1100 includes determining, utilizing a prompt classification model, that an additional prompt received from the client device involves the one or more mathematical problems. In some cases, the series of acts 1100 includes based on determining that the additional prompt involves one or more mathematical problems, generating a mathematic code segment by processing the prompt utilizing the context engine comprising one or more large language models. Moreover, in one or more implementations, the series of acts 1100 includes generating a mathematic result for the additional prompt by processing the mathematic code segment using a mathematic engine that solves the one or more mathematical problems within the additional prompt according to a structure of the mathematic code segment. In one or more embodiments, the series of acts 1100 can include generating a response to the additional prompt based at least in part on the mathematic result.

In some cases, the series of acts 1100 can include determining, utilizing a prompt classification model, that a prompt received from a client device involves one or more logical problems. Additionally, in one or more embodiments, the series of acts 1100 includes based on determining that the prompt involves the one or more logical problems, generating one or more logic code segments by processing the prompt utilizing a context engine comprising one or more large language models. In some cases, the series of acts 1100 includes generating one or more logic results for the prompt by processing the one or more logic code segments using a logic engine that solves the one or more logical problems within the prompt according to a structure of the one or more logic code segments. Furthermore, in one or more embodiments, the series of acts 1100 includes generating a response to the prompt based at least in part on the one or more logic results. Additionally, in some cases, the series of acts 1100 can include providing the response for display on a graphical user interface of the client device.

Moreover, in some implementations, the series of acts 1100 includes determining one or more missing logic constraints for solving the one or more logical problems within the prompt. Furthermore, in one or more cases, the series of acts 1100 includes generating a modified logic code segment by adding the one or more missing logic constraints to a logic code segment to inform the logic engine. Moreover, in one or more embodiments, the series of acts 1100 can include generating an updated logic response for the prompt by processing the modified logic code segment using the logic engine.

Additionally, in some cases the series of acts 1100 can include generating, utilizing the context engine, a logical plan partitioning the prompt into one or more ordered steps corresponding to the one or more logical problems. In some implementations, the series of acts 1100 includes based on the logical plan, generate the one or more logic results that solve the one or more logical problems within the prompt according to the one or more ordered steps.

In one or more cases, the series of acts 1100 can include identifying, utilizing the context engine, a time phrase within the prompt. In some embodiments, the series of acts 1100 can include generating, utilizing a large language model, a time code segment representing the time phrase. The series of acts 1100 further includes an act of generating a time block from the time code segment utilizing an interpreter engine coupled to the context engine. Additionally, the series of acts 1100 can further include generating a time result utilizing the context engine to process the time block. In some cases, the series of acts 1100 can include generating the response based at least in part on the time result.

Moreover, the series of acts 1100 can include generating a first logic result utilizing a first logic engine to solve a first logical problem within the prompt.

Furthermore, the series of acts 1100 can include generating a second logic result utilizing a second logic engine to solve a second logical problem within the prompt that differs from the first logical problem. In some cases, the series of acts 1100 includes generating the response to the prompt based at least in part on the first logic result and the second logic result.

Additionally, the series of acts 1100 can include generating the response to the prompt with a retrieval augmented generation (RAG) system based at least in part on one or more source content items associated with a user account of a content management system. Moreover, the series of acts 1100 can include generating a dependency graph reflecting relationships between the one or more source content items, the prompt, and the response. In one or more embodiments, the series of acts 1100 can include determining an accuracy of the response based on the dependency graph.

Further, the series of acts 1100 can include determining that an additional prompt received from the client device involves one or more mathematical problems. Moreover, the series of acts 1100 includes based on determining that the additional prompt involves the one or more mathematical problem, generating a mathematic code segment by processing the additional prompt utilizing the context engine. Moreover, in some cases, the series of acts 1100 includes generating a mathematic result for the additional prompt by processing the mathematic code segment using a mathematic engine that solves the one or more mathematical problems within the additional prompt. Additionally, the series of acts 1100 includes generating a response to the additional prompt based at least in part on the mathematic result.

In one or more cases, the series of acts 1100 includes determining, utilizing a prompt classification model, that a prompt received from a client device involves one or more logical problems. Additionally, in one or more implementations, the series of acts 1100 can include based on determining that the prompt involves the one or more logical problems, generating a logic code segment by processing the prompt utilizing a context engine comprising one or more large language models. Further, the series of acts 1100 can include selecting a logic engine to solve the one or more logical problems within the prompt according to a structure of the logic code segment. Furthermore, the series of acts 1100 can include generating a logic result for the prompt by processing the logic code segment using the selected logic engine. In some embodiments, the series of acts 1100 can include generating a response to the prompt based at least in part on the logic result Additionally, in one or more implementations, the series of acts 1100 can include receiving, from the logic engine, an error result indicating one or more missing logic constraints for solving the one or more logical problems within the prompt. Moreover, in some cases, the series of acts 1100 can include based on the error result, requesting from the client device an additional prompt with information related to the one or more missing logic constraints. Additionally, in one or more embodiments, the series of acts 1100 includes based on receiving the additional prompt, generating a modified logic code segment by adding the one or more missing logic constraints to the logic code segment to inform the logic engine. Further, the series of acts 1100 can include generating an updated logic response for the prompt by processing the modified logic code segment using the logic engine.

In some cases, the series of acts 1100 includes receiving, from the logic engine, an error result for the prompt indicating the one or more logical problems within the prompt are unsolvable. Furthermore, in one or more embodiments, the series of acts 1100 includes providing, for display on the client device, an error result notification comprising a reason why the one or more logical problems within the prompt are unsolvable.

Additionally, in some cases, the series of acts 1100 can include generating, utilizing a large language model, a logical plan partitioning the prompt into one or more ordered steps for solving the one or more logical problems. Moreover, in some implementations, the series of acts 1100 includes based on the logical plan, generating the logic code segment that solves the one or more logical problems within the prompt.

Further, in some cases, the series of acts 1100 includes generating an additional logic result from the prompt that solves a logical problem from the one or more logical problems by processing the logic code segment using an additional logic engine.

In one or more embodiments, the series of acts 1100 can include determining one or more logical problem types for the one or more logical problems. Additionally, in some cases, the series of acts 1100 includes selecting one or more logic engines based on the one or more logical problem types of the one or more logical problems.

Figure 12:
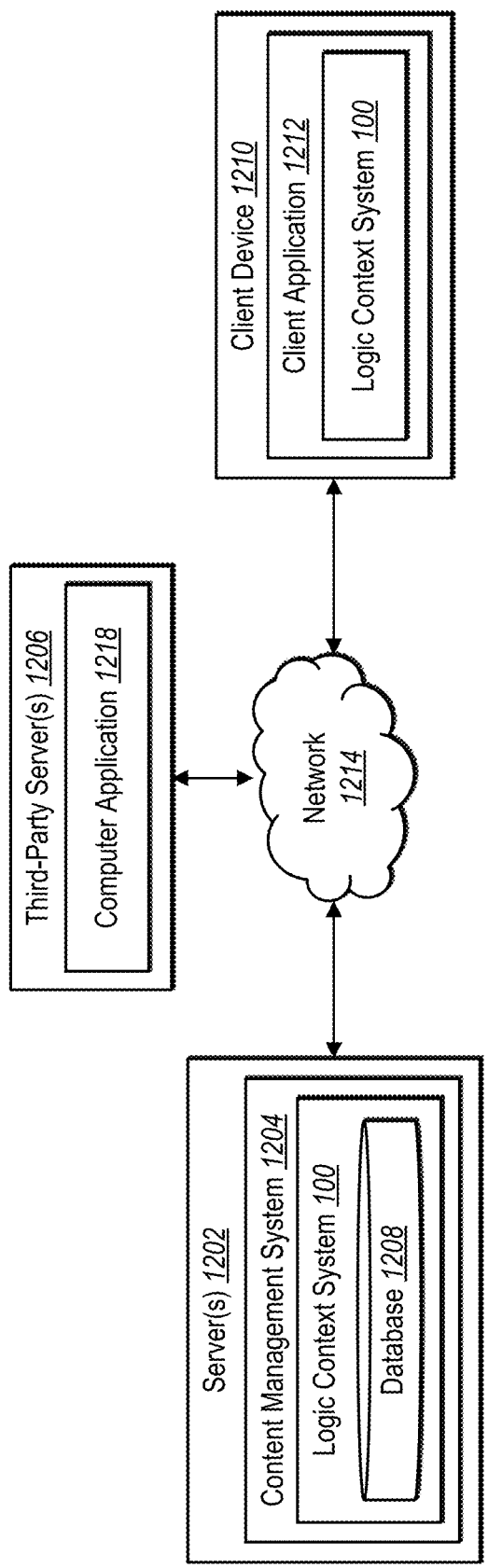
FIG. 12 illustrates a diagram of an environment in which a logic context system can operate in accordance with one or more embodiments.

FIG. 12 illustrates a schematic diagram of an example system environment for implementing the logic context system 100 in accordance with one or more implementations. As shown, the environment includes server(s) 1202, a client device 1210, third-party server(s) 1206, a database 1208, and a network 1214. Each of the components of the environment can communicate via the network 1214, and the network 1214 may be any suitable network over which computing devices can communicate. Example networks are discussed in more detail below in relation to FIGS. 13-11.

As mentioned above, the example environment includes a client device 1210. The client device 1210 can be one of a variety of computing devices, including a smartphone, a tablet, a smart television, a desktop computer, a laptop computer, a virtual reality device, an augmented reality device, or another computing device as described in relation to FIGS. 13-11. The client device 1210 can communicate with the server(s) 1202 via the network 1214. For example, the client device 1210 can receive user input from a user interacting with the client device 1210 (e.g., via the client application 1212) to, for instance, generate a response to a prompt that involves logical reasoning and/or that involves accessing source content items associated with the user account within the content management system 1204 or associated with the user account and stored within the third-party server(s) 1206, to search for one or more content items, perform a task, or to select a graphical user interface element. In addition, the logic context system 100 on the server(s) 1202 can receive information relating to various interactions with graphical user interface elements based on the input received by the client device 1210 (e.g., to select a modified prompt that includes one or more missing constraints for a logical problem).

As shown, the client device 1210 can include a client application 1212. In particular, the client application 1212 may be a web application, a native application installed on the client device 1210 (e.g., a mobile application, a desktop application, etc.), or a cloud-based application where all or part of the functionality is performed by the server(s) 1202. Based on instructions from the client application 1212, the client device 1210 can present or display information, including a response, or code segments (e.g., logic code segments or mathematic code segments) corresponding to one or more problems (e.g., logical problems or mathematical problems) within a prompt.

As illustrated in FIG. 12, the example environment also includes the server(s) 1202. The server(s) 1202 may generate, track, store, process, receive, search, and transmit electronic data, such as digital content (e.g., content items), datasets, searchable data, pages of data, prompts, interface elements, logic code segments, mathematic code segments, logic results, mathematic results, constraints, interactions with interface elements, metadata, and/or interactions between user accounts or client devices. For example, the server(s) 1202 may receive data from the client device 1210 in the form of prompt to generate a response about which contractor to use for a project given certain industry regulations and goals of an entity. In addition, the server(s) 1202 can transmit data to the client device 1210 in the form of a graphical user interface that includes a window for receiving a prompt or query and a window that displays a response or performed task that involves solving one or more logical and/or mathematical problems. Indeed, the server(s) 1202 can communicate with the client device 1210 to send and/or receive data via the network 1214. In some implementations, the server(s) 1202 comprise(s) a distributed server where the server(s) 1202 include(s) a number of server devices distributed across the network 1214 and located in different physical locations. The server(s) 1202 can comprise one or more content servers, application servers, communication servers, web-hosting servers, machine learning server, and other types of servers.

As shown in FIG. 12, the server(s) 1202 can also include the logic context system 100 as part of a content management system 1204. The content management system 1204 can communicate with the client device 1210 to perform various functions associated with the prompt. Indeed, the content management system 1204 can include a network-based smart cloud storage system to manage, store, synchronize, and maintain content items associated with user accounts within the content management system and link the content management system 1204 to computer applications external to the content management system 1204 that are connected to the content management system via one or more software connectors. In some embodiments, logic context system 100 and/or the content management system 1204 utilize a database 1208 to store source content items and responses generated by the context engine, the logic engine, and/or the mathematic engine.

FIG. 12 further illustrates a third-party server(s) 1206. In particular, the third-party server(s) 1206 can host or house a computer application 1218 that includes or that searches or generates (as part of its native application functions) one or more content items. For example, the third-party server(s) 1206 can include a server location hosting the computer application 1218 that is external to the logic context system 100 and the content management system 1204. In some cases, the third-party server(s) 1206 is external to the logic context system 100, but the logic context system 100 can nevertheless access the computer application 1218 via one or more, connectors, plugins, APIs, or other network-based access protocols.

Although FIG. 12 depicts the logic context system 100 located on the server(s) 1202, in some implementations, the logic context system 100 may be implemented by (e.g., located entirely or in part on) one or more other components of the environment. For example, the logic context system 100 may be implemented by the client device 1210 and/or a third-party device. For example, the client device 1210 can download all or part of the logic context system 100 for implementation independent of, or together with, the server(s) 1202.

In some implementations, though not illustrated in FIG. 12, the environment may have a different arrangement of components and/or may have a different number or set of components altogether. For example, the client device 1210 may communicate directly with the logic context system 100 bypassing the network 1214. As another example, the environment can include the database 1208 located external to the server(s) 1202 (e.g., in communication via the network 1214) or located on the server(s) 1202, on a third-party server(s) 1206, and/or on the client device 1210.

In one or more implementations, each of the components of the logic context system 100 are in communication with one another using any suitable communication technologies. Additionally, the components of the logic context system 100 can be in communication with one or more other devices including one or more client devices described above. It will be recognized that in as much the logic context system 100 is shown to be separate in the above description, any of the subcomponents may be combined into fewer components, such as into a single component, or divided into more components as may serve a particular implementation.

Figure 13:
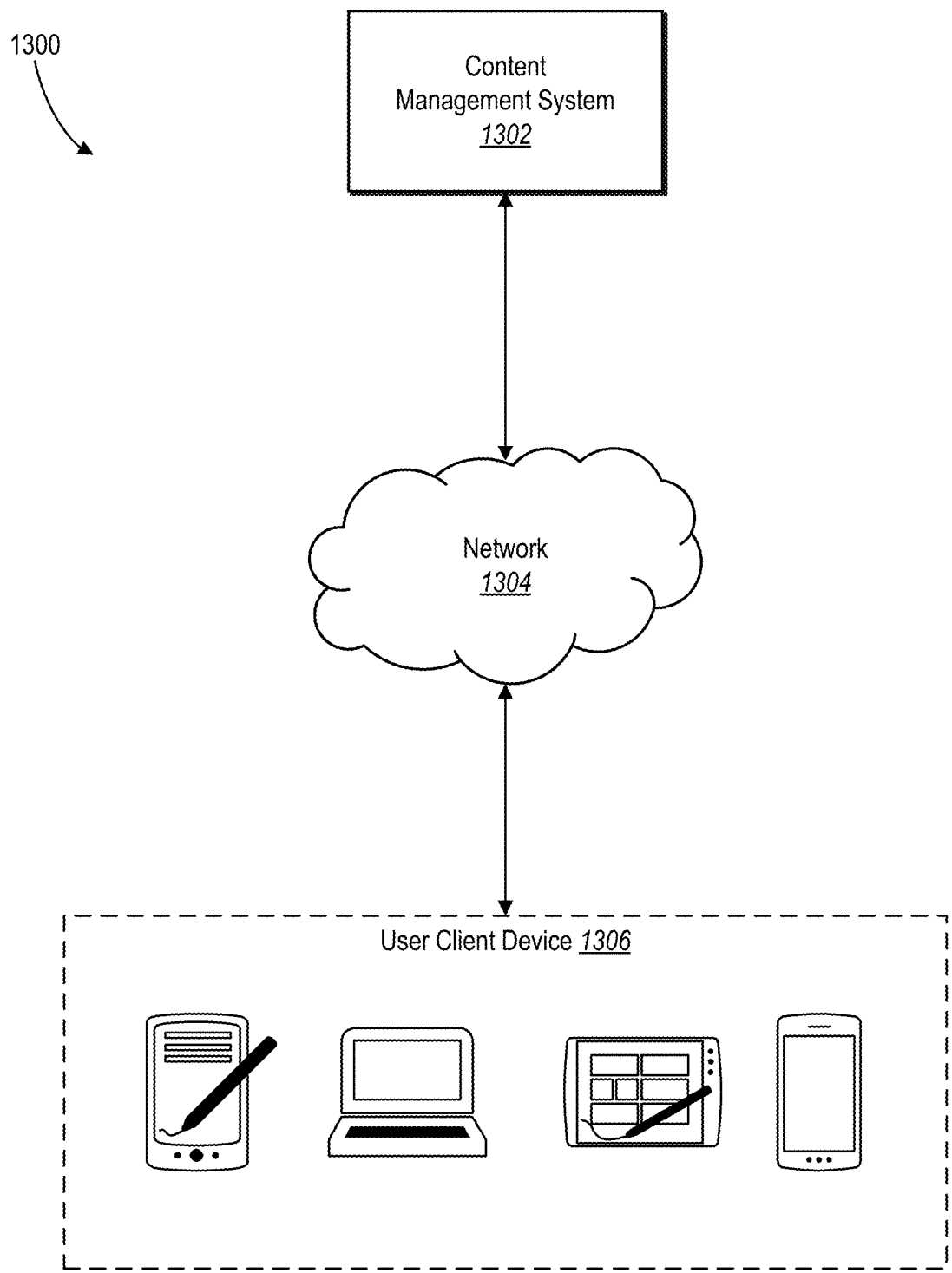
FIG. 13 illustrates an example environment of a networking system having the logic context system in accordance with one or more embodiments.

FIG. 13 is a schematic diagram illustrating environment 1300 within which one or more implementations of the logic context system 100 can be implemented. As discussed above with respect to FIG. 12, in some embodiments, the logic context system 100 can be part of a content management system 1302. In one or more embodiments, the content management system 1302 may generate, store, manage, receive, and send digital content (such as digital videos). For example, content management system 1302 may send and receive digital content to and from the user client device 1306 by way of network 1304. In particular, the content management system 1302 can store and manage a collection of digital content. The content management system 1302 can manage the sharing of digital content between computing devices associated with a plurality of users. For instance, the content management system 1302 can facilitate a user sharing a digital content with another user of content management system 1302.

In particular, the content management system 1302 can manage synchronizing digital content across multiple of the user client device 1306 associated with one or more users. For example, a user may edit digital content using user client device 1306. The content management system 1302 can cause user client device 1306 to send the edited digital content to content management system 1302. Content management system 1302 then synchronizes the edited digital content on one or more additional computing devices.

In addition to synchronizing digital content across multiple devices, one or more implementations of content management system 1302 can provide an efficient storage option for users that have large collections of digital content. For example, content management system 1302 can store a collection of digital content on content management system 1302, while the user client device 1306 only stores reduced-sized versions of the digital content. A user can navigate and browse the reduced-sized versions (e.g., a thumbnail of a digital image) of the digital content on user client device 1306. In particular, one way in which a user can experience digital content is to browse the reduced-sized versions of the digital content on user client device 1306.

Another way in which a user can experience digital content is to select a reduced-size version of digital content to request the full- or high-resolution version of digital content from content management system 1302. In particular, upon a user selecting a reduced-sized version of digital content, user client device 1306 sends a request to content management system 1302 requesting the digital content associated with the reduced-sized version of the digital content. Content management system 1302 can respond to the request by sending the digital content to user client device 1306. User client device 1306, upon receiving the digital content, can then present the digital content to the user. In this way, a user can have access to large collections of digital content while minimizing the amount of resources used on user client device 1306.

User client device 1306 may be a desktop computer, a laptop computer, a tablet computer, a personal digital assistant (PDA), an in- or out-of-car navigation system, a hand-held device, a smart phone or other cellular or mobile phone, or a mobile gaming device, other mobile device, or other suitable computing devices. User client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1306 may access content management system 1302.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

Figure 14:
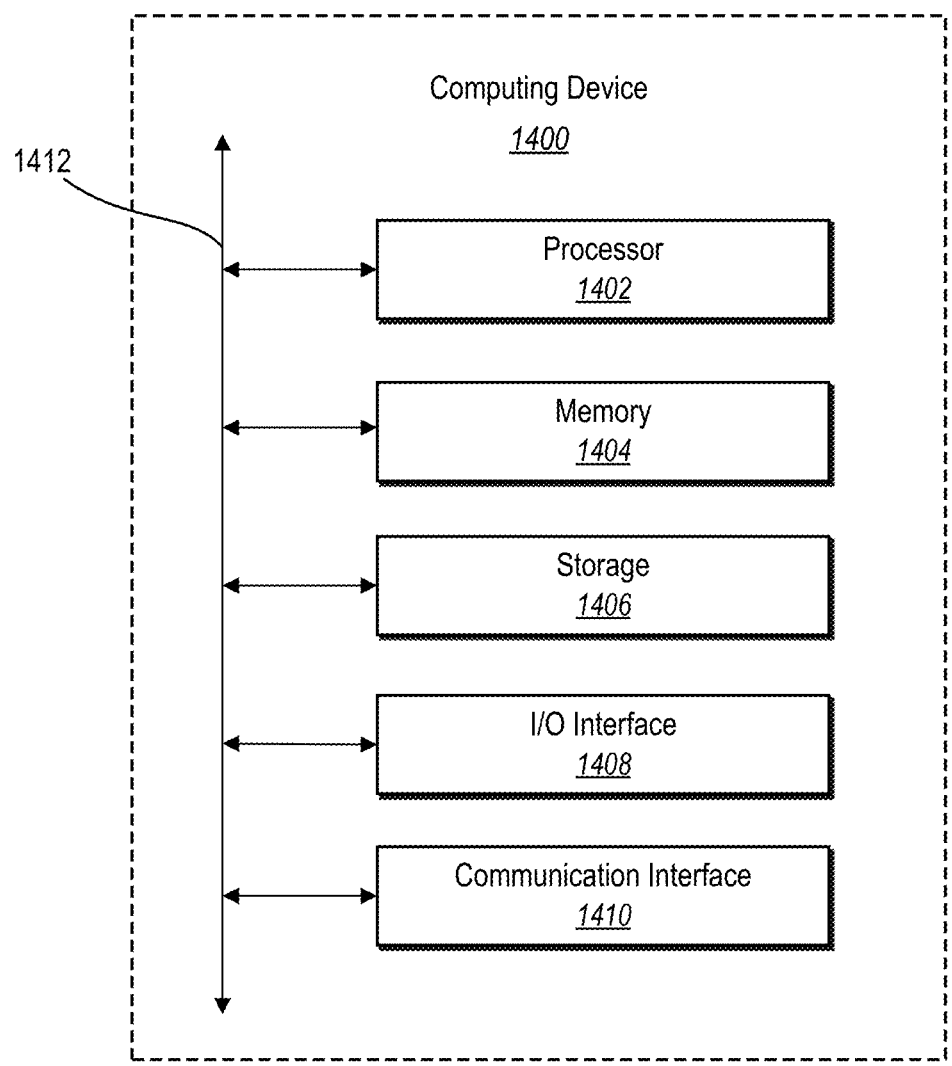
FIG. 14 illustrates a block diagram of an exemplary computing device in accordance with one or more embodiments.

FIG. 14 illustrates a block diagram of exemplary computing device 1400 that may be configured to perform one or more of the processes described above. The components of the logic context system 100 can include software, hardware, or both. For example, the components of the logic context system 100 can include one or more instructions stored on a computer-readable storage medium and executable by processors of one or more computing devices (e.g., the computing device 1400). When executed by the one or more processors, the computer-executable instructions of the logic context system 100 can cause the computing device 1400 to perform the methods described herein. Alternatively, the components of the logic context system 100 can comprise hardware, such as a special purpose processing device to perform a certain function or group of functions. Additionally, or alternatively, the components of the logic context system 100 can include a combination of computer-executable instructions and hardware.

Furthermore, the components of the logic context system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the logic context system 100 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 14 illustrates a block diagram of exemplary computing device 1400 that may be configured to perform one or more of the processes described above. One will appreciate that third-party server(s) 1206, the client device 1210, and/or the computing device 1400 may comprise one or more computing devices such as computing device 1400. As shown by FIG. 14, computing device 1400 can comprise processor 1402, memory 1404, a storage device, a I/O interface, and communication interface 1410, which may be communicatively coupled by way of communication infrastructure 1412. While an exemplary computing device 1400 is shown in FIG. 14, the components illustrated in FIG. 14 are not intended to be limiting. Additional or alternative components may be used in other implementations. Furthermore, in certain implementations, computing device 1400 can include fewer components than those shown in FIG. 14. Components of computing device 1400 shown in FIG. 14 will now be described in additional detail.

In particular implementations, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage device 1406 and decode and execute them. In particular implementations, processor 1402 may include one or more internal caches for data, instructions, or addresses. As an example, and not by way of limitation, processor 1402 may include one or more instruction caches, one or more data caches, and one or more translation lookaside buffers (TLBs). Instructions in the instruction caches may be copies of instructions in memory 1404 or storage device 1406.

Memory 1404 may be used for storing data, metadata, and programs for execution by the processor(s). Memory 1404 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1404 may be internal or distributed memory.

Storage device 1406 includes storage for storing data or instructions. As an example, and not by way of limitation, storage device 1406 can comprise a non-transitory storage medium described above. Storage device 1406 may include a hard disk drive (HDD), a floppy disk drive, flash memory, an optical disc, a magneto-optical disc, magnetic tape, or a Universal Serial Bus (USB) drive or a combination of two or more of these. Storage device 1406 may include removable or non-removable (or fixed) media, where appropriate. Storage device 1406 may be internal or external to computing device 1400. In particular implementations, storage device 1406 is non-volatile, solid-state memory. In other implementations, Storage device 1406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1408 allows a user to provide input to, receive output from, and otherwise transfer data to and receive data from computing device 1400. I/O interface 1408 may include a mouse, a keypad or a keyboard, a touch screen, a camera, an optical scanner, network interface, modem, other known I/O devices or a combination of such I/O interfaces. I/O interface 1408 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1408 is configured to provide graphical data to a display for presentation to a user. The graphical data may be representative of one or more graphical interfaces and/or any other graphical content as may serve a particular implementation.

Communication interface 1410 can include hardware, software, or both. In any event, communication interface 1410 can provide one or more interfaces for communication (such as, for example, packet-based communication) between computing device 1400 and one or more other computing devices or networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1410 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1412 may include hardware, software, or both that couples components of computing device 1400 to each other. As an example and not by way of limitation, communication infrastructure 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    determining, utilizing a prompt classification model, that a prompt received from a client device involves one or more logical problems;
    based on determining that the prompt involves the one or more logical problems, generating a logic code segment by processing the prompt utilizing a context engine comprising one or more large language models;
    generating a logic result for the prompt by processing the logic code segment using a logic engine that solves the one or more logical problems involved with the prompt according to a structure of the logic code segment; and
    generating a response to the prompt based at least in part on the logic result.

2. The computer-implemented method of claim 1, further comprising:
    receiving, from the logic engine, an error result for the prompt;
    generating, based on the error result, a modified logic code segment by determining missing logic constraints in the logic code segment for solving the one or more logical problems involved with the prompt using the logic engine; and
    generating an updated logic response for the prompt by processing the modified logic code segment using the logic engine.

3. The computer-implemented method of claim 1, further comprising:
    generating, utilizing the context engine, a logical plan partitioning the prompt into the one or more logical problems; and
    based on the logical plan, generating a logic code segment that solves the one or more logical problems involved with the prompt.

4. The computer-implemented method of claim 1, further comprising:
    generating an additional logic result from the prompt by processing the logic code segment using an additional logic engine that solves the one or more logical problems involved with the prompt according to a different structure of the logic code segment.

5. The computer-implemented method of claim 1, further comprising:
    generating a first logic result utilizing a first logic engine to solve a first logical problem within the prompt;
    generating a second logic result utilizing a second logic engine to solve a second logical problem within the prompt; and
    generating the response to the prompt based at least in part on the first logic result and the second logic result.

6. The computer-implemented method of claim 1, further comprising:
    generating the response to the prompt with a retrieval augmented generation (RAG) system based at least in part on one or more source content items associated with a user account of a content management system; and
    determining an accuracy of the response based on the logic result for the prompt.

7. The computer-implemented method of claim 1, further comprising:
    determining, utilizing a prompt classification model, that an additional prompt received from the client device involves one or more mathematical problems;
    based on determining that the additional prompt involves the one or more mathematical problems, generating a mathematic code segment by processing the additional prompt utilizing the context engine comprising one or more large language models;
    generating a mathematic result for the additional prompt by processing the mathematic code segment using a mathematic engine that solves the one or more mathematical problems involved with the additional prompt according to a structure of the mathematic code segment; and generating a response to the additional prompt based at least in part on the mathematic result.

8. A system comprising:
at least one processor; and
a non-transitory computer readable medium comprising instructions that, when executed by the at least one processor, cause the system to:
  determine, utilizing a prompt classification model, that a prompt received from a client device involves one or more logical problems;
  based on determining that the prompt involves the one or more logical problems, generate one or more logic code segments by processing the prompt utilizing a context engine comprising one or more large language models;
  generate one or more logic results for the prompt by processing the one or more logic code segments using a logic engine that solves the one or more logical problems involved with the prompt according to a structure of the one or more logic code segments;
  generate a response to the prompt based at least in part on the one or more logic results; and
  provide the response for display on a graphical user interface of the client device.

9. The system of claim 8, further comprising instructions that, when executed by the at least one processor, cause the system to:
  determine one or more missing logic constraints for solving the one or more logical problems involved with the prompt;
  generate a modified logic code segment by adding the one or more missing logic constraints to a logic code segment to inform the logic engine; and
  generate an updated logic response for the prompt by processing the modified logic code segment using the logic engine.

10. The system of claim 8, further comprising instructions that, when executed by the at least one processor, cause the system to:
  generate, utilizing the context engine, a logical plan partitioning the prompt into one or more ordered steps corresponding to the one or more logical problems; and
  based on the logical plan, generate one or more logic results that solve the one or more logical problems involved with the prompt according to the one or more ordered steps.

11. The system of claim 8, further comprising instructions that, when executed by the at least one processor, cause the system to:
  identify, utilizing the context engine, a time phrase within the prompt;
  generate, utilizing a large language model, a time code segment representing the time phrase;
  generate a time block from the time code segment utilizing an interpreter engine coupled to the context engine;
  generate a time result utilizing the context engine to process the time block; and
  generate the response based at least in part on the time result.

12. The system of claim 8, further comprising instructions that, when executed by the at least one processor, cause the system to:
  generate a first logic result utilizing a first logic engine to solve a first logical problem within the prompt;
  generate a second logic result utilizing a second logic engine to solve a second logical problem within the prompt that differs from the first logical problem; and
  generate the response to the prompt based at least in part on the first logic result and the second logic result.

13. The system of claim 8, further comprising instructions that, when executed by the at least one processor, cause the system to:
  generate the response to the prompt with a retrieval augmented generation (RAG) system based at least in part on one or more source content items associated with a user account of a content management system;
  generate a dependency graph reflecting relationships between the one or more source content items, the prompt, and the response; and
  determine an accuracy of the response based on the dependency graph.

14. The system of claim 8, further comprising instructions that, when executed by the at least one processor, cause the system to:
  determine that an additional prompt received from the client device involves one or more mathematical problems;
  based on determining that the additional prompt involves the one or more mathematical problems, generate a mathematic code segment by processing the additional prompt utilizing the context engine;
  generate a mathematic result for the additional prompt by processing the mathematic code segment using a mathematic engine that solves the one or more mathematical problems involved with the additional prompt; and
  generate a response to the additional prompt based at least in part on the mathematic result.

15. A non-transitory computer readable medium comprising instructions that, when executed by at least one processor, cause the at least one processor to:
  determine, utilizing a prompt classification model, that a prompt received from a client device involves one or more logical problems;
  based on determining that the prompt involves the one or more logical problems, generate a logic code segment by processing the prompt utilizing a context engine comprising one or more large language models;
  select a logic engine to solve the one or more logical problems involved with the prompt, wherein the selected logic engine solves the one or more logical problems according to a structure of the logic code segment;
  generate a logic result for the prompt by processing the logic code segment using the selected logic engine; and
  generate a response to the prompt based at least in part on the logic result.

16. The non-transitory computer readable medium of claim 15, further comprising instructions that, when executed by the at least one processor, cause the at least one processor to:
  receive, from the logic engine, an error result indicating one or more missing logic constraints for solving the one or more logical problems involved with the prompt;
  based on the error result, request from the client device an additional prompt with information related to the one or more missing logic constraints;
  based on receiving the additional prompt, generate a modified logic code segment by adding the one or more missing logic constraints to the logic code segment to inform the logic engine; and generate an updated logic response for the prompt by processing the modified logic code segment using the logic engine.

17. The non-transitory computer readable medium of claim 15, further comprising instructions that, when executed by the at least one processor, cause the at least one processor to:
receive, from the logic engine, an error result for the prompt indicating the one or more logical problems involved with the prompt are unsolvable; and
provide, for display on the client device, an error result notification comprising a reason why the one or more logical problems involved with the prompt are unsolvable.

18. The non-transitory computer readable medium of claim 15, further comprising instructions that, when executed by the at least one processor, cause the at least one processor to:
generate, utilizing a large language model, a logical plan partitioning the prompt into one or more ordered steps for solving the one or more logical problems; and
based on the logical plan, generate a logic code segment that solves the one or more logical problems involved with the prompt.

19. The non-transitory computer readable medium of claim 15, further comprising instructions that, when executed by the at least one processor, cause the at least one processor to:
generate an additional logic result from the prompt that solves a logical problem from the one or more logical problems by processing the logic code segment using an additional logic engine.

20. The non-transitory computer readable medium of claim 15, further comprising instructions that, when executed by the at least one processor, cause the at least one processor to:
determine one or more logical problem types for the one or more logical problems; and
select one or more logic engines based on the one or more logical problem types of the one or more logical problems.

* * * * *